(12) United States Patent
Bellet et al.

(10) Patent No.: US 12,160,483 B2
(45) Date of Patent: Dec. 3, 2024

(54) STATUS INDICATORS FOR COMMUNICATING USER ACTIVITY ACROSS DIGITAL CONTEXTS

(71) Applicant: MICROSOFT TECHNOLOGY LICENSING, LLC, Redmond, WA (US)

(72) Inventors: Vincent Bellet, Kirkland, WA (US); Marc Christophe Pottier, Redmond, WA (US); Paul Sim, Redmond, WA (US); Karvell Li, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/663,047

(22) Filed: Oct. 24, 2019

(65) Prior Publication Data
US 2021/0126983 A1    Apr. 29, 2021

(51) Int. Cl.
*H04L 51/216*   (2022.01)
*G06F 3/0482*   (2013.01)
(Continued)

(52) U.S. Cl.
CPC .......... *H04L 67/535* (2022.05); *G06F 3/0482* (2013.01); *H04L 51/216* (2022.05); *G06Q 10/101* (2013.01); *G06Q 10/103* (2013.01)

(58) Field of Classification Search
CPC ...... G06F 16/93; G06F 16/176; G06F 40/166; G06F 40/169; G06F 40/103;
(Continued)

(56) References Cited

U.S. PATENT DOCUMENTS 9,383,888 B2    7/2016  Fish et al.
2006/0053380 A1*  3/2006  Spataro ................. G06F 16/93
                                            715/753
(Continued)

FOREIGN PATENT DOCUMENTS

CN      105264516 A      1/2016

OTHER PUBLICATIONS

"International Search Report and the Written Opinion Issued in PCT Application No. PCT/US2020/054890", Mailed Date: Dec. 11, 2020, 13 Pages.
(Continued)

*Primary Examiner* — Tom Y Chang
(74) *Attorney, Agent, or Firm* — Newport IP, LLC; Jacob P. Rohwer

(57) ABSTRACT

Systems and methods for providing status indicators for various forms of user activity that occurs across different digital contexts of a collaboration platform. A system can monitor activity that a particular user is performing within a particular digital context and provide status indicators to a different user within a different digital context when the monitored activity meets one or more criteria. For example, a system may cause a status indicator to be displayed in association with a data object within the digital context of a message thread when a specific type of user activity is occurring with respect to that data object within the digital context of an application that facilitates editing of the content of the data object. Thus, a system can deliver timely and contextually relevant status indicators about how team members are currently interacting with a data object without users having to switch between digital contexts.

20 Claims, 17 Drawing Sheets

(51) Int. Cl.
*H04L 67/50* (2022.01)
*G06Q 10/10* (2023.01)
*G06Q 10/101* (2023.01)

(58) Field of Classification Search
CPC .. G06F 40/106; G06Q 10/101; G06Q 10/103; G06Q 50/18
See application file for complete search history.

(56) References Cited

U.S. PATENT DOCUMENTS

| | | | |
|---|---|---|---|
| 2008/0005235 A1 | 1/2008 | Hegde et al. | |
| 2012/0226806 A1 | 9/2012 | Knight et al. | |
| 2013/0191451 A1 | 7/2013 | Tse et al. | |
| 2014/0372526 A1* | 12/2014 | Zaveri | H04L 51/046 709/204 |
| 2015/0288774 A1* | 10/2015 | Larabie-Belanger | H04L 65/403 715/753 |
| 2017/0195381 A1* | 7/2017 | Michael | G06Q 10/103 |
| 2018/0309801 A1* | 10/2018 | Rathod | H04M 3/5175 |
| 2018/0350144 A1* | 12/2018 | Rathod | G06Q 20/3224 |
| 2018/0365263 A1* | 12/2018 | Mohan | G06F 16/168 |
| 2019/0212878 A1 | 7/2019 | Otero | |
| 2019/0342369 A1* | 11/2019 | Procopio | H04L 67/10 |

OTHER PUBLICATIONS

Churchill, et al., "Anchored Conversations: Chatting in the Context of a Document", In Proceedings of SIGCHI Conference on Human Factors in Computing Systems, Apr. 1, 2000, pp. 454-461.

Fadzillah, et al., "Activity-Based Entities Relationship in Monitoring Context Awareness", In Proceedings of International Conference on Context-Aware Systems and Applications, Nov. 26, 2012, 9 Pages.

Houben, et al., "Co-Activity Manager: Integrating Activity-Based Collaboration into the Desktop Interface", In Proceedings of the International Working Conference on Advanced Visual Interfaces, May 21, 2012, pp. 398-401.

Wolber, Andy, "How G Suite's Real-Time Presence Feature Aids Collaboration in Microsoft Office Apps", Retrieved from https://www.techrepublic.com/article/how-g-suites-real-time-presence-feature-aids-collaboration-in-microsoft-office-apps/, Oct. 25, 2018, 10 Pages.

* cited by examiner

STATUS INDICATORS FOR COMMUNICATING USER ACTIVITY ACROSS DIGITAL CONTEXTS

BACKGROUND

There are a number of existing tools that allow users to collaborate and share information. Some web-based word processor programs even allow different users to concurrently view and edit web-based documents. For example, two different users can have the same document open at the same time on their respective computing devices and can even see each other's contributions as they occur in real time. Some web-based word processor programs also provide visual indicators that represent who is currently viewing or editing a particular web-based document. For instance, in a web-based word processor interface, a system may generate a visual indicator signifying an identity of a person that is editing a web-based document and even which portion of the web-based document that person is editing.

Although there are a number of existing tools that allow different users to collaborate and even see each other's contributions in real time, these existing tools still have a number of shortcomings. One shortcoming is that existing tools generally require that different users be concurrently using a web-based document within the same digital context in order to see precisely how each other user is interacting with that web-based document. For example, in order to see who is actively contributing to a web-based document and what those contributions are, a user typically must have that web-based document open on their computing device. Thus, unless two different users happen to have the same web-based document open concurrently on their respective devices, neither user will be made aware in real-time of who is actively viewing or contributing to the web-based document. Such drawbacks of existing systems can lead to loss of productivity as well as inefficient use of computing resources.

It is with respect to these and other considerations that the following disclosure is made.

SUMMARY

The techniques disclosed herein enable systems to provide status indicators for various forms of user activity that occurs across different digital contexts of a collaboration platform. Generally described, a system can monitor activity that a particular user is performing within a particular digital context and provide status indicators to a different user within a different digital context when the monitored activity meets one or more criteria. For example, a system may cause a status indicator to be displayed in association with a data object within the digital context of a message thread when a specific type of user activity is occurring with respect to that data object within the digital context of an application that facilitates editing of the content of the data object. In such an example, a person can share the data object (e.g., a document, a spreadsheet, etc.) between multiple users by attaching the data object to a message within the digital context of the message thread. Then, without having to transition out of the digital context of the message thread, the person that shared the data object (or even other users that are viewing the relevant message thread) can be presented with status indicators describing another person's status when that other person is interacting with the data object in a manner that meets one or more criteria. Thus, a system can deliver timely and contextually relevant status indicators about how team members are currently interacting with a data object in a variety of different digital contexts. Timely delivery of a status indicator about how another person is currently interacting with a data object enables a recipient of the status indicator to establish an efficient collaboration protocol with that other person. For example, the recipient of the status indicator can send a message to the other person while they are interacting with the data object to inform that other person that the recipient is available if needed. As another example, the recipient of the status indicator can switch their own digital context with respect to the data object to match that of the other person whom is interacting with the data object.

The techniques disclosed herein can also provide a recipient of a status indicator with an ability to perform various actions that are made available based on a current status of a user that corresponds to the status indicator. For example, a system can monitor activity of a particular user and determine that the particular user is utilizing a word processor application to edit content of a document. Based on this determination, the system may provide the status indicator to the recipient within an appropriate digital context such as, for example, the digital context of a message thread through which the document was shared. In this example, the system may also analyze calendar data associated with the particular user whom is editing the content of the document to determine that the current status of the particular user is "available." Here, based on the combination of the particular user having a current status of "available" while concurrently using the word processor application to edit the content of the document, the system may provide the recipient of the status indicator with an ability to message the particular user directly within the word processor application. For example, the recipient may "right-click" on some portion of the status indicator to expose a list of one or more available actions. Then, the recipient may select a "messaging" action to transcribe a message within the digital context that the status indicator is displayed and to transmit this message into the particular user within the different digital context that they are using to interact with the data object.

Suppose in contrast, however, that the current status of the particular user was instead "Busy"—e.g., due to calendar data indicating that the particular user is currently attending a meeting. For example, the particular user may be utilizing the word processor application to edit the content of the document but may be doing so while in a meeting with other people. Under these contrasting circumstances, based on the combination of the particular user having a current status of "busy" while using the word processor application to edit the content of the document, the system may still provide a status indictor but may refrain from providing the recipient of the status indicator with an ability to message the particular user directly within the word processor application. Thus, it can be appreciated that the techniques described herein allow a system to facilitate certain actions that are appropriate based on a current status of a user that corresponds to the status indicator.

In some configurations, a system can also provide a recipient of a status indicator with an ability to perform various actions that are made available based on a particular digital context within which a user that corresponds to the status indicator is interacting with a data object. For example, a system can monitor activity of a particular user and determine that the particular user is utilizing a word processor application to edit content of a document. Based on this determination, the system may provide the recipient of a status indicator with an ability to transcribe a message within the digital context of the message thread and then transmit this message to the particular user within the digital context of the word processor application. For example, based on a determination that the particular user is interacting with the data object via the word processor application, a "right-click" on the status indicator may expose on option to send a message directly to the particular user within the word processor application. In contrast, if the system determines instead that the particular user is sharing the content of the document within a video conference session (e.g., a live two-way audio video stream between two or more users), then the system may provide the recipient of the status indicator with an ability to join the video conference session. For example, based on a determination that the particular user is sharing the data object via the video conference session, a "right-click" on the status indicator may expose on option to join the video conference session and, thereby, listen to and/or participate in the discussion of the data object.

In this way, when a recipient receives a status indicator within a particular digital context (e.g., the message thread), the recipient may also be provided with an ability to perform various actions that are determined to be appropriate based on the digital context within which another user is interacting with the data object associated with the status indicator. Additionally, or alternatively, the recipient may be restricted from performing actions that are determined to be inappropriate based on the digital context within which another user is interacting with the data object associated with the status indicator.

The techniques disclosed herein can provide a number of technical benefits. For instance, by providing status indicators to a recipient within a particular digital context when user activity is detected with respect to a data object within some other digital context, a system can increase the utilization of the status indicators. For example, this can provide status information that may not be otherwise identified by the recipient. In addition, automatic delivery of the status information within the particular digital context mitigates or eliminates the need for the recipient to periodically switch to the other digital context (e.g., within which the detected user activity is performed) to check for current and/or recent user activity. Such techniques can increase the efficiency of a computing system by reducing the number of times a user needs to toggle between digital contexts with a computing device to obtain relevant information. Thus, the usage of various computing resources such as network resources, memory resources, and processing resources can be significantly reduced.

The efficiencies derived from the analysis described above can also lead to other efficiencies. In particular, by automating a number of different processes for generating status notifications, user interaction with the computing device can be improved. The reduction of manual data entry and improvement of user interaction between a human and a computer can result in a number of other benefits. For instance, by reducing the need for manual entry, inadvertent inputs and human error can be reduced. This can ultimately lead to more efficient use of computing resources such as memory usage, network usage, processing resources, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
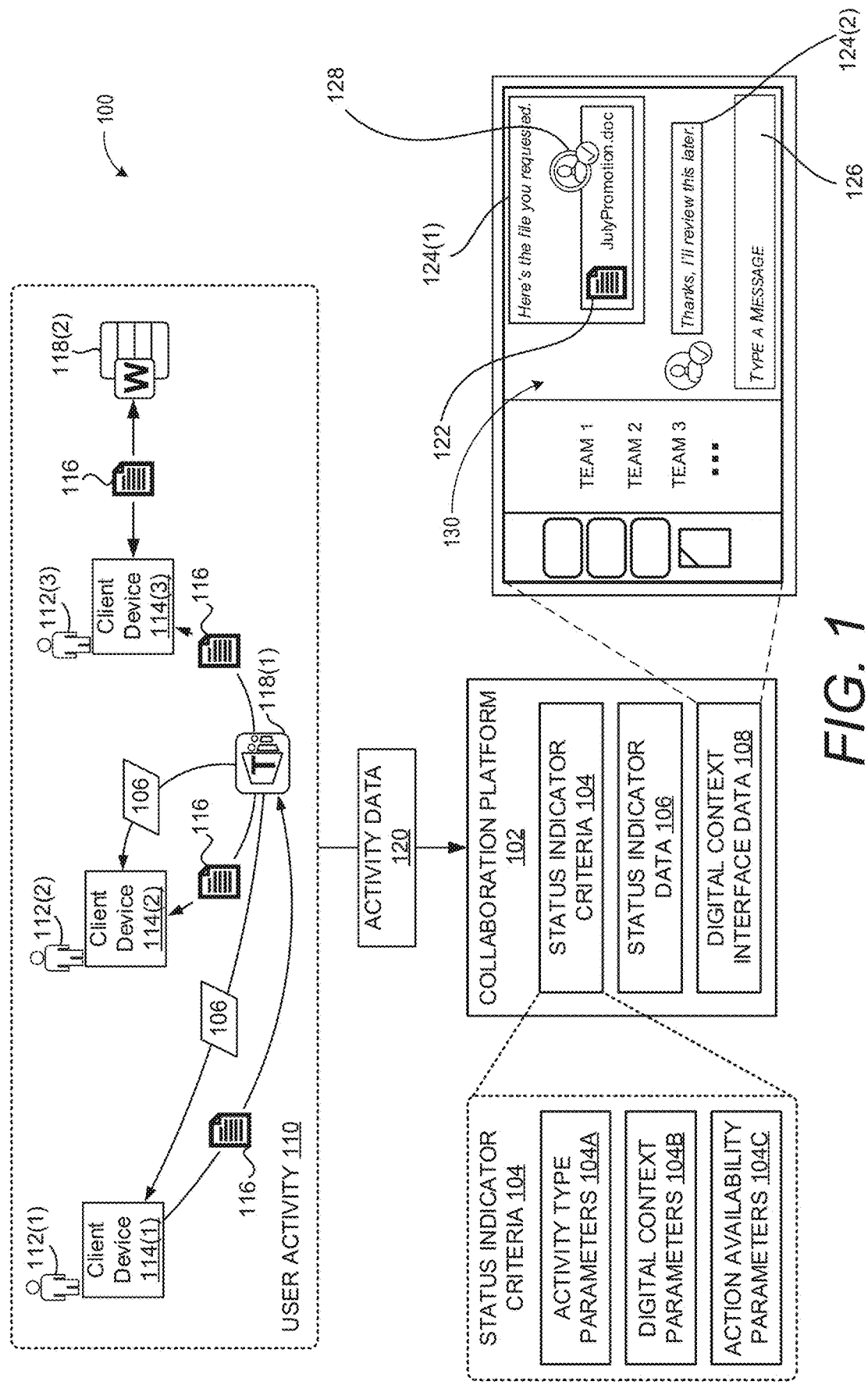
FIG. 1 illustrates a system 100 in an example scenario for illustrating aspects of the present disclosure.

FIG. 1 illustrates a system 100 in an example scenario for illustrating aspects of the present disclosure. The techniques disclosed herein improve existing systems by providing status indicators 128 to intended recipients about various forms of user activity 110 that occurs across different digital contexts 118 of a collaboration platform 102. For example, the system 100 can monitor activity that a particular user is performing within a particular digital context and provide status indicators 128 to a different user within a different digital context when the monitored activity meets one or more criteria. As a specific but non-limiting example, the system 100 may cause a status indicator 128 to be displayed in association with a data object 116 within the digital context of a message thread 130 in response to a specific type of user activity 110 occurring with respect to that data object 116 within the digital context of an application that facilitates editing of the content of the data object 116. In such an example, a first user 112(1) can share the data object 116 (e.g., a document, a spreadsheet, a meeting invitation, a survey, etc.) between multiple users by attaching the data object 116 to a message 124(1) within the digital context of a message thread graphical user interface (GUI) 130 (also referred to herein as "a message thread GUI arrangement"). Then, without having to transition away from the message thread GUI 130, the first user 112(1) that shared the data object 116 (or even other users that are actively viewing the relevant message thread) may be presented with a status indicator 128 that indicates when another user (e.g., the third user 112(3) in the illustrated example) is interacting with the data object 116 in a manner that meets one or more criteria. In this way, the system 100 can deliver timely and contextually relevant status indicators 128 about how users are currently interacting with a data object 116 in a variety of different digital contexts 118—thereby enabling a recipient of the status indicator 128 to establish an efficient collaboration protocol with those users.

In various implementations, one or more components of the system 100 can analyze activity data 120 with respect to status indicator criteria 104 to generate status indicator data 106. Generally described, the status indicator data 106 defines various aspects of how a status indicator 128 is to be displayed so as to indicate when, and in some instances how, a particular user 112 is using a client device 114 to interact with a data object 116 or content thereof. For example, the status indicator data 106 may identify a user whom is interacting with the data object 116 and a specific digital context 118 that the user is interacting with the data object 116 within. Then, as this status indicator data 106 is generated, digital context interface data 108 may be updated based on the status indicator data 106 in a manner that causes a status indicator 128 to be displayed to a recipient within an appropriate digital context 118—which as described above may be different than the digital context 118 within which the particular user is interacting with the data object 116. The digital context interface data 108 may define aspects how one or more graphical user interfaces (GUIs) are to be displayed on a client device 114 when that client device 114 is communicating with the collaboration platform 102 to facilitate a particular digital context. For example, the digital context interface data 108 may define how the message thread GUI 130 is to be rendered on a client device 114 when a user 112 has selected that digital context. As another example, the digital context interface data 108 may define how a word processor preview GUI is to be rendered on a client device 114 in response to a user 112 selecting a data object 116 within the message thread GUI 130 to change the selected digital context. As used herein, the term "digital context" refers to a computing environment within which at least one of a graphical representation of a data object (e.g., an icon that represents a file) or content of the data object (e.g., text, graphics, and/or other digital media type) is exposed to a user via an output device of a computer (e.g., a display screen). For example, an icon that represents a word processing file being rendered within a chat message of a persistence chat graphical user interface (GUI) may aptly be referred to as a first digital context of exposing aspects of the word processing file. As another example, underlying content of the work processing file being rendered for viewing and/or editing via a word processing application GUI may aptly be referred to as a second digital context of exposing aspects of the work processing file.

For purposes of the present discussion, an exemplary scenario is graphically represented within the user activity 110 of FIG. 1. In this exemplary scenario, each of a first user 112(1), a second user 112(2), and a third user 112(3) utilize one or more respective client devices 114 to collaborate with one another within one or more digital contexts 118. In some embodiments, one or more of these digital contexts 118 may be in whole or in part facilitated by the collaboration platform 102. For example, the collaboration platform 102 may facilitate a first digital context 118(1) that enables the plurality of users 112 to collaborate with one another by sending and receiving messages within the message thread GUI 130. The collaboration platform 102 may further enable users to share data objects 116 within the message thread GUI 130. For example, in the scenario illustrated in the user activity 110 of FIG. 1, the first user 112(1) is shown to be sharing a data object 116 with the second user 112(2) and the third user 112(3) within the first digital context 118(1). Thus, the data object 116 is shown to flow from the first client device 114(1) into the first digital context 118(1). Furthermore, the data object 116 is shown to flow to each of the second client device 114(2) and the third client device 114(3) in association with this first digital context 118(1). In this way, upon the first user 112(1) attaching the data object 116 to a first message 124(1) within the first digital context 118(1), each of the second user 112(2) and the third user 112(3) are enabled to access the data object 116 (e.g. by clicking on an icon 122 that represents the data object 116) via the first digital context 118(1). As used herein, the term "icon" refers to a graphical representation of a data object. As further illustrated, the message thread GUI 130 may include one or more other messages (e.g., the second message 124(2)) and a message generation field 126 for typing and/or dictating message content.

Within the exemplary scenario illustrated in the user activity 110 of FIG. 1, the third user 112(3) is shown to be interacting with the data object 116 within a second digital context 118(2). In some implementations, the third user 112(3) may utilize an application on the third client device 114(3) to open the data object 116 and to view and/or edit content thereof. For example, the third user 112(3) may select the data object 116 (e.g., by clicking on the icon 122) to open the data object 116 within a word processor application so that the underlying content of the data object 116 is viewable and/or editable. FIG. 4B illustrates an exemplary graphical user interface that can be displayed to a user 112 in response to that user clicking on the icon 122 within the first digital context 118(1) to enter the second digital context 118(2) within which content of the data object 116 can be actively viewed, edited, or otherwise interacted with. Exemplary applications for interacting with the data object 116 within this second digital context 118(2) may be web-based applications for which functionality thereof is accessible through a web-browser application running on the client devices 114. For example, a web-based word processor application may facilitate functionality such as viewing content (e.g., text, images, data values, etc.) of the data object 116, editing this content (e.g., adding content, deleting content, moving content, reformatting content, etc.), affixing comments to various portions of this content, and so on—all through a web-browser that serves as a portal to this underlying functionality. Additionally, or alternatively, an application for interacting with the data object 116 within the second digital context 118(2) may be a native desktop application for which functionalities are implemented locally on the individual client devices 114.

As further illustrated, status indicator data 106 is transmitted to the first client device 114(1) to cause the status indicator 128 to be displayed to the first user 112(1) (also referred to herein as the "recipient" of the status indicator 128). For example, in response to a determination that the third user 112(3) is currently interacting with the data object 116 within the second digital context 118(2), the status indicator 128 may be displayed to the first user 112(1) within the first digital context 118(1) and in association with the icon 122 that graphically represents the data object 116 within the first message 124(1). In this way, after having shared the data object 116 within the digital context of the message thread GUI 130, the first user 112(1) may be automatically presented with the status indicator 128 when activity data 120 associated with the third user 112(3) meets some or all of the status indicator criteria 104. Additionally, or alternatively, the status indicator data 106 may be transmitted to the second client device 114(2) to cause the status indicator 128 to be displayed to the second user 112(2). In this way, the system 100 presents various users 112 with status indicators 128 that communicate real-time information about how other users 112 are interacting with certain data objects 116. This enables the various recipients of the status indicators 128 to establish efficient communication protocols with those other users while they are currently interacting with the data objects 116.

Within the context of FIG. 1, the activity data 120 is indicative of substantially real-time user activity 110 that is occurring with respect to the data object 116 (e.g., a document, a spreadsheet, etc.) within one or more digital contexts 118 of the collaboration platform 102. For example, the activity data 120 may indicate that a particular user 112 is currently viewing content of the data object 116 within the digital context of a word processor application. Stated alternatively, the activity data 120 may indicate that the particular user currently has the data object 116 open within a word processor application that is running locally on a client device 114 and/or that the client device 114 is accessing via a web-browser application. As another example, the activity data 120 may indicate whether the particular user 112 is currently making substantive edits to the content of the data object 116 within the digital context of the word processor application. In such an example, the system 100 may monitor the user activity 110 to identify edits that the particular user 112 is making to the content of the digital document 116. Then, the system 100 may analyze these edits to determine whether to classify these edits as substantive or non-substantive. As a specific but non-limiting example, the system 100 may determine that one or more edits correspond to the particular user 112 correcting various grammatical issues that are non-substantive in nature (e.g., the particular user may change the word "there" to "they're" to match the appropriate context). In contrast, the system 100 may determine that one or more edits correspond to the particular user substantively altering the content of the digital document 116 (e.g., the particular user may delete a portion of the content, the particular user may add new content, etc.). As described in more detail below, in some embodiments, the status indicator criteria 104 may be defined such that providing a status indictor 128 to a recipient is contingent upon edits to a data object being substantive in nature. The foregoing examples of user activity 110 that may be indicated within the activity data 120 are provided for illustrative purposes only. Many other types of user activity 110 are contemplated—some of which are described in detail below.

In some embodiments, the status indicator criteria 104 may include activity type parameters 104A that prescribe circumstances under which certain types of user activity 110 are to result in status indicators 128 being provided to one or more users 112. For illustrative purposes, presume that the first user 112(1) is currently viewing the message thread GUI 130 on the first client device 114(1). Further presume that while the first user 112(1) is viewing the message thread GUI 130, the third user 112(3) begins to interact with the data object 116 on the third client device 114(3). As a result, corresponding activity data 120 is generated based on the third user 112(3) interacting with the data object 116.

In some embodiments, the activity type parameters 104A may prescribe that a status indicator 128 is displayed to a recipient that is within a particular digital context (e.g., the first digital context 118(1)) whenever one or more other users 112 begin to interact with that data object 116. For example, in the context of the scenario illustrated within the user activity 110 in FIG. 1, the status indicator criteria 104 may be satisfied based on the third user 112(3) simply opening the data object 116 within the second digital context 118(2)—even if no edits are made to the underlying content of the data object 116. Then, in response to the third user 112(3) simply opening the data object 116 within the second digital context 118(2), the status indicator data 106 may be transmitted to the first client device 114(1) to cause the status indicator 128 to be displayed to the first user 112(1) directly within the first digital context 118(1).

In some embodiments, the activity type parameters 104A may prescribe that a status indicator 128 is displayed to a recipient that is within a particular digital context 118 when one or more other users 112 begin to edit underlying content of that data object 116. For example, the status indicator criteria 104 may not be satisfied immediately upon the third user 112(3) opening the data object 116 within the second digital context 118(2). In such an example, the third user 112(3) could potentially review the content of a document or spreadsheet without other users being notified via presentation of a status indicator 128. Then, responsive to the third user 112(3) beginning to edit the content of the data object 116 within the second digital context 118(2), the system 100 may determine that the status indicator criteria 104 has been satisfied. At this point, the status indicator data 106 may be transmitted to the first client device 114(1) to cause the status indicator 128 to be displayed to the first user 112(1) directly within the first digital context 118(1).

In some embodiments, the activity type parameters 104A may prescribe that a status indicator 128 is displayed to a recipient that is within a particular digital context 118 when one or more other users 112 make certain types of edits to the underlying content of that data object 116. As a specific but nonlimiting example, the system 100 may monitor the user activity 110 to identify one or more edits that the third user 112(3) is making to the data object 116. Then, the system 100 may determine whether these edits fall under one or more predetermined classifications (e.g., substantive edits, non-substantive edits, formatting edits, etc.). For illustrative purposes, presume that the third user 112(3) edits the content of the data object 116 by changing the word "there" to "they're" but does otherwise edit the content. Under these circumstances, the system 100 may determine that the edit is limited to correcting a spelling error and, therefore, may classify this edit as non-substantive. In some instances, the activity type parameters 104A may be defined such that non-substantive edits will not result in a status indicator 128 being displayed to a recipient. Stated alternatively, non-substantive edits do not result in a determination of the status indicator criteria 104 being satisfied. In contrast to the above circumstances, presume that the third user 112(3) instead edits the content of the data object 116 by deleting an entire paragraph and replacing the deleted paragraph with five new paragraphs. Under these circumstances, the system 100 may determine that this edit substantively alters one or more aspects of the data object 116 and, therefore, may classify this edit as being substantive. In some instances, the activity type parameters 104A may be defined such that substantive edits will result in a status indicator 128 being displayed to the recipient. Stated alternatively, substantive edits do result in a determination of the status indicator criteria 104 being satisfied.

In some embodiments, the activity type parameters 104A may prescribe that a status indicator 128 is displayed to a recipient that is within a particular digital context 118 when one or more other users 112 edit the content in a predefined manner (e.g. to make those edits conspicuous). For example, suppose that a user 112 opens the data object 116 within a word processor application and then turns on a feature that is designed to keep track of any edits that are made (an exemplary such feature is the "Track Changes" feature in MICROSOFT WORD). Further suppose that once this feature is turned on, the user makes one or more edits to the data object 116. As another example, suppose that a user 112 makes one or more edits and then adds some predefined emphasis to these edits by, for example, highlighting the edits, bolding the edits, italicizing the edits, etc. Based on these example, it will be appreciated that editing content of a data object 116 (e.g., a document, spreadsheet, slide presentation, etc.) in some predefined manner(s) may serve as an indication that the user whom is making the edits intends that other users become aware of these edits. Thus, in some implementations, the activity type parameters 104A may be defined such that edits which are made in some predefined manner will result in a status indicator 128 being displayed to the recipient.

In some embodiments, the activity type parameters 104A may prescribe that a status indicator 128 is displayed to a recipient that is within a particular digital context 118 when user activity 110 reaches a threshold level with respect to a data object 116. As a specific example, the activity type parameters 104A may be satisfied when a user edits (e.g., adds, deletes, etc.) at least a threshold number of characters with digital document (e.g., 100 characters, or any other suitable number). In this example, the third user 112(3) may open the data object 116 within the digital context of a web-based word processor application and may even begin to edit the document without any status indictor 128 being displayed to the first user 112(1). However, once the cumulative amount of edits that are entered by the third user 112(3) reach the predefined threshold, then the system 100 may determine that this user activity 110 satisfies the status indicator criteria 104. As another specific example, the activity type parameters 104A may be satisfied when a user interacts with the data object 116 in a particular manner (e.g., views, actively edits, etc.) for a predefined amount of time. In this example, the third user 112(3) may open the data object 116 and interact with the content thereof for less than the predefined amount of time without a status indicator 128 being displayed to the first user 112(1). However, once the length of time of the user's interactions reaches the predefined amount of time, the system 100 will transmit the status indicator data 106 to the first client device 114(1)—thereby causing the status indicator 128 to be displayed within the first digital context 118(1).

In some embodiments, the activity type parameters 104A may prescribe that a status indicator 128 is displayed to a specific user that is within a particular digital context 118 when user activity 110 occurs with respect to specific portions of a data object 116 that are associated with that specific user. For illustrative purposes, presume that metadata associated with the digital object 116 indicates that the first user 112(1) is the predominant author of and/or has been assigned responsibility for a specific sub-section of the content. Under these circumstances, if the user activity 110 indicates that the third user 112(3) is actively editing portions of the document that are different than the specific sub-section, then the system 100 may refrain from causing any status indicator 128 to be displayed to the first user 112(1). In contrast, if the user activity 110 indicates that the third user 112(3) is actively editing the specific sub-section, then the system 100 may immediately respond by transmitting the status indicator data 106 to the first client device 112(1) to cause the status indicator 128 to be displayed to the first user 112(1).

In some implementations, the system 100 may determine that a specific portion of a data object 116 is associated with a specific user based a level of contribution that the specific user has made in relation to the specific portion of the data object 116. For example, as one or more users generate content in association with the data object 116, metadata may be generated and stored to maintain a record of which specific users generated (or otherwise contributed to) specific portions of the content. To illustrate this point, suppose that a specific sub-section of a data object includes 1000 alphanumeric characters and that the metadata associated with the data object 116 indicates which specific user(s) added each individual one of these 1000 alphanumeric characters into the content. Under these circumstances, the system 100 may determine a level of contribution for the specific user(s) as a percentage of the characters that were generated by the individual specific user(s). For example, if the first user 112(1) contributed 900 alphanumeric characters whereas the second user 112(2) contributed 100 alphanumeric characters, the system 100 may determine that the first user 112(1) has a contribution level of 90% and that the second user 112(2) has a contribution level of 10%. In some implementations, the activity type parameters 104A may be defined such that status indicators 128 are presented to users having a level of contribution that exceeds a threshold level of contribution. In this way, the system 100 may be configured to provide status indicators to one or more specific users 112 when other users begin to interact with (e.g., view, edits, comment on, etc.) a specific portion of a data object 116 (e.g., a document, etc.) that the one or more specific users contributed at least a threshold amount to (e.g., by adding at least 25% of the total content of the specific portion, by being the top contributor to the specific portion, by being within the top N contributors (N being a positive integer value), or any other suitable threshold amount).

In some embodiments, the status indicator criteria 104 may include digital context parameters 104B that prescribe particular digital contexts 118 within which certain types of user activity 110 are to result in status indicators 128 being provided to one or more users 112. For illustrative purposes, presume that the first user 112(1) is currently interacting with the collaboration platform 102 within the first digital context 118(1), e.g. the first user 112(1) may be viewing the message thread GUI 130 on the first client device 114(1). Further, presume that the second user 112(2) is currently interacting with the collaboration platform 102 within some other digital context, e.g. the second user 112(2) may be utilizing the collaboration platform 102 to actively participate in a videoconference with other users. Under these circumstances, the digital context parameters 104B may prescribe that certain types of user activity 110 (including but not limited to those specific examples provided above) is to trigger a status indictor being presented to users that are currently interacting with the collaboration platform 102 within the first digital context but not users that are currently interacting with the collaboration platform 102 within the second digital context.

In some embodiments, the system 100 may determine digital contexts 118 for individual users 112 based on variety of factors. For example, in some embodiments, the collaboration platform 102 may be a unified communications platform that combines multiple functionalities that may include, but are not limited to, persistent workplace chat (e.g., as represented by the message thread GUI 130), video meetings, file storage, and application integration (e.g., direct access to a word processing application, a spreadsheet application, and so on directly from the collaboration platform 102). In some implementations, one or more functionalities of the collaboration platform 102 may be facilitated via integration with an online productivity suite such as, for example, MICROSOFT OFFICE 365, GOOGLE G-SUITE, etc. In this example, the system 100 may determine a current digital context 118 associated with a particular user based on which specific functionalities of the collaboration platform 102 the particular user is currently utilizing. For example, if the particular user is currently utilizing the message thread GUI 130 as shown in FIG. 1 to view and/or generate one or more persistent chat messages, then the system 100 may weigh this as a factor in determining a digital context of the particular user. As another example, if a different user is currently utilizing a word processor functionality associated with the collaboration platform 102 to view and/or edit content of a data object, then the system 100 may weigh this as a factor in determining a different digital context for this different user.

In some embodiments, the status indicator criteria 104 may include available action parameters 104C that prescribe one or more computing actions to make available to a recipient of a status indicator 128 based on various factors. Exemplary such factors include, but are not limited to, a current status of a particular user 112 who's corresponding user activity 110 resulted in the status indicator 128 being provided to the recipient, a current status of the recipient of the status indicator 128, a current digital context of a particular user 112 who's corresponding user activity 110 resulted in the status indicator 128 being provided to the recipient, and/or a current digital context of the recipient of the status indicator 128.

For illustrative purposes, consider a scenario such as that illustrated within the user activity 110 of FIG. 1 in which the first user 112(1) is provided with a status indicator 128 within the digital context of the message thread GUI 130 in response to the third user 112(3) interacting with the data object 116 within the digital context of a word processing application. Within the context of this scenario, suppose that the available action parameters 104C prescribe that a recipient whom receives a status indicator 128 within the digital context of the message thread GUI 130 it is to be provided with an ability to generate a message directly within the message thread GUI 130 and to have this message transmitted directly to the particular user 112 who's user activity 110 triggered the status indicator 128 and directly into the particular digital context 118 within which the user activity 110 occurred. Under these circumstances, when the first user 112(1) receives the status indicator 128 within the message thread GUI 130, the first user 112(1) may be able to click on the status indicator to expose a menu of available actions which include sending a message to the third user 112(3) in the word processing application directly from the message thread GUI 130.

As an expansion to the foregoing scenario, suppose that the available action parameters 104C further prescribe this action of messaging the particular user's whose activity triggered the status indicator 128 is contingent upon the status of this particular user currently matching one or more predefined statuses. For example, the available action parameters 104C may be defined such that recipient of the status indicator 128 is provided with an ability to message a particular user's activity trigger the status indicator 120 if, and only if, that particular user's current status is "available." Under these circumstances, when the first user 112(1) receives the status indicator 128 within the message thread GUI 130, the system 100 may refrain from providing the first user 112(1) with the ability to message the third user 112(3) in the event that the third user 112(3) as a current status of "Busy"—e.g., due to the third user 112(3) having time blocked out on the calendar, due to the third user 112(3) in currently participating in a live video conference, and so on.

Figure 2A:
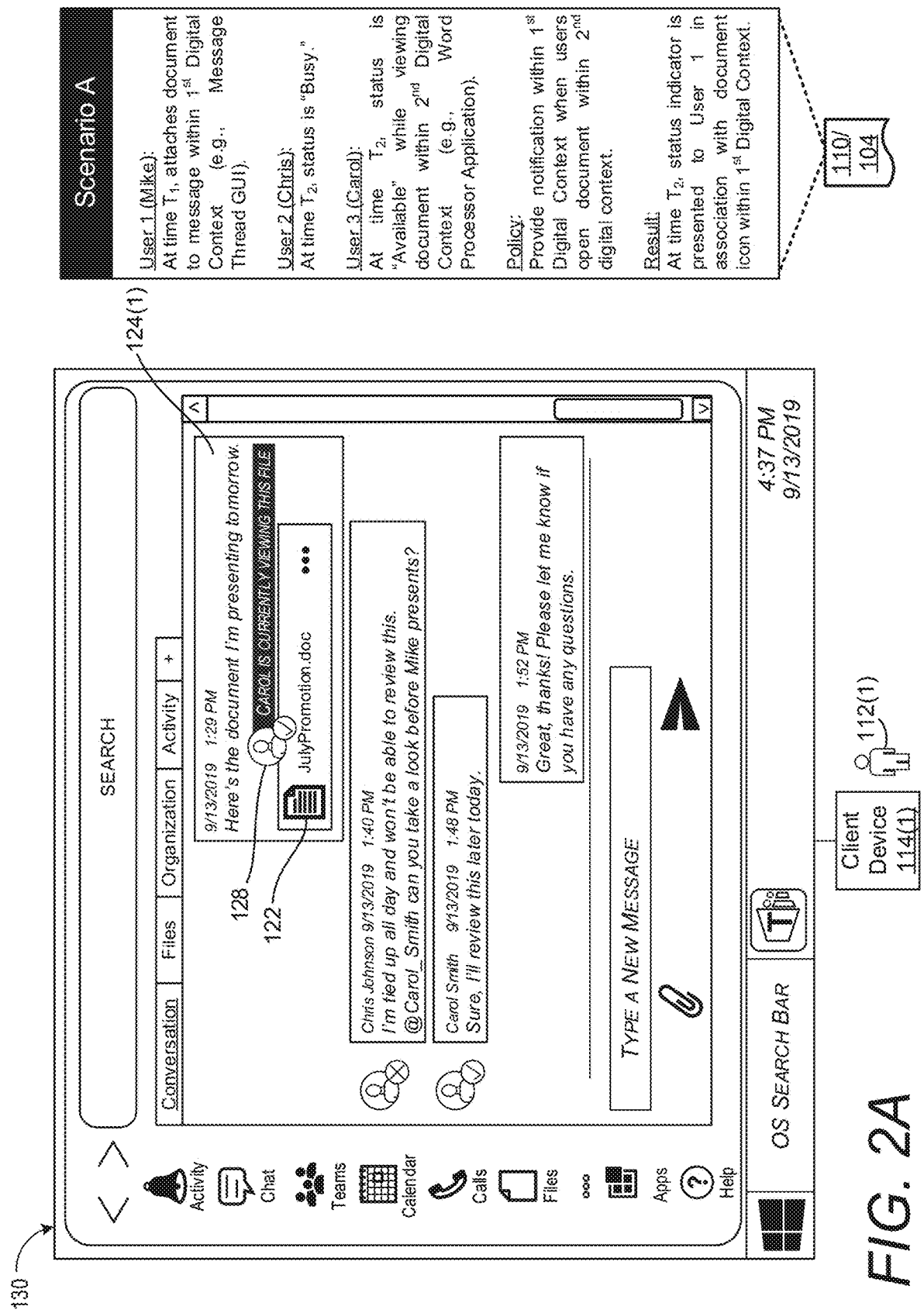
FIG. 2A illustrates a scenario where a collaboration platform is providing a first user with a status indicator within a first digital context in response to another user interacting with a data object within a second digital context that is different than the first digital context.

Turning now to FIG. 2A through FIG. 2F, example user interfaces are provided to illustrate different examples of various status indicators 128 that are displayed based on the detection of different scenarios. In particular, FIG. 2A illustrates a scenario where a collaboration platform 102 is providing a first user 112(1) with a status indicator 128 within a first digital context in response to another user interacting with a data object 116 within a second digital context that is different than the first digital context. As illustrated, at a first time $T_1$ (e.g., 1:29 PM as indicated in the first message 124(1)), the user activity 110 corresponding to this specific scenario includes the first user 112(1) attaching the data object 116 to a first message 124(1) within a message thread GUI 130. Then, at a second time $T_2$ (e.g., 4:37 PM as indicated in the lower-right corner of the illustrated screen), the user activity 110 corresponding to the specific scenario includes a second user 112(2) having a current status of "Busy" and a third user 112(3) having a current status of "Available." Furthermore, at the second time $T_2$, the third user 112(3) is interacting with the data object 116 that was shared within the first message 124(1) within some second digital context that is different than the first digital context that is graphically represented in FIG. 2A. For example, the third user 112(3) may be interacting with the data object 116 in the digital context of a word processor application as shown in FIG. 4B. Also, in this scenario, the status indicator criteria 104 indicate a policy for governing when the system 100 is to display a status indicator 128. As illustrated, the policy that is outlined in FIG. 1 is designed to cause the system 100 to provide the status indicator 128 to users that are currently within the first digital context when other users open the data object 116 (e.g., which is represented as a word processing document entitled "JulyPromotion.doc") for viewing within a second digital context. Thus, in response to the third user viewing the document within the second digital context, the system 100 automatically presents a status indicator 128, indicating the status of the third user 112(3), to the first user 112(1) within the first digital context. In some implementations, the status indicator 128 may include an indication of the status of a particular user whose user activity 110 triggered the status indicator 128. For example, in the illustrated scenario, the status indicator 128 includes the text "CAROL IS CURRENTLY VIEWING THIS FILE" to provide the first user with additional insight as to what has triggered the status indicator 128.

Figure 2B:
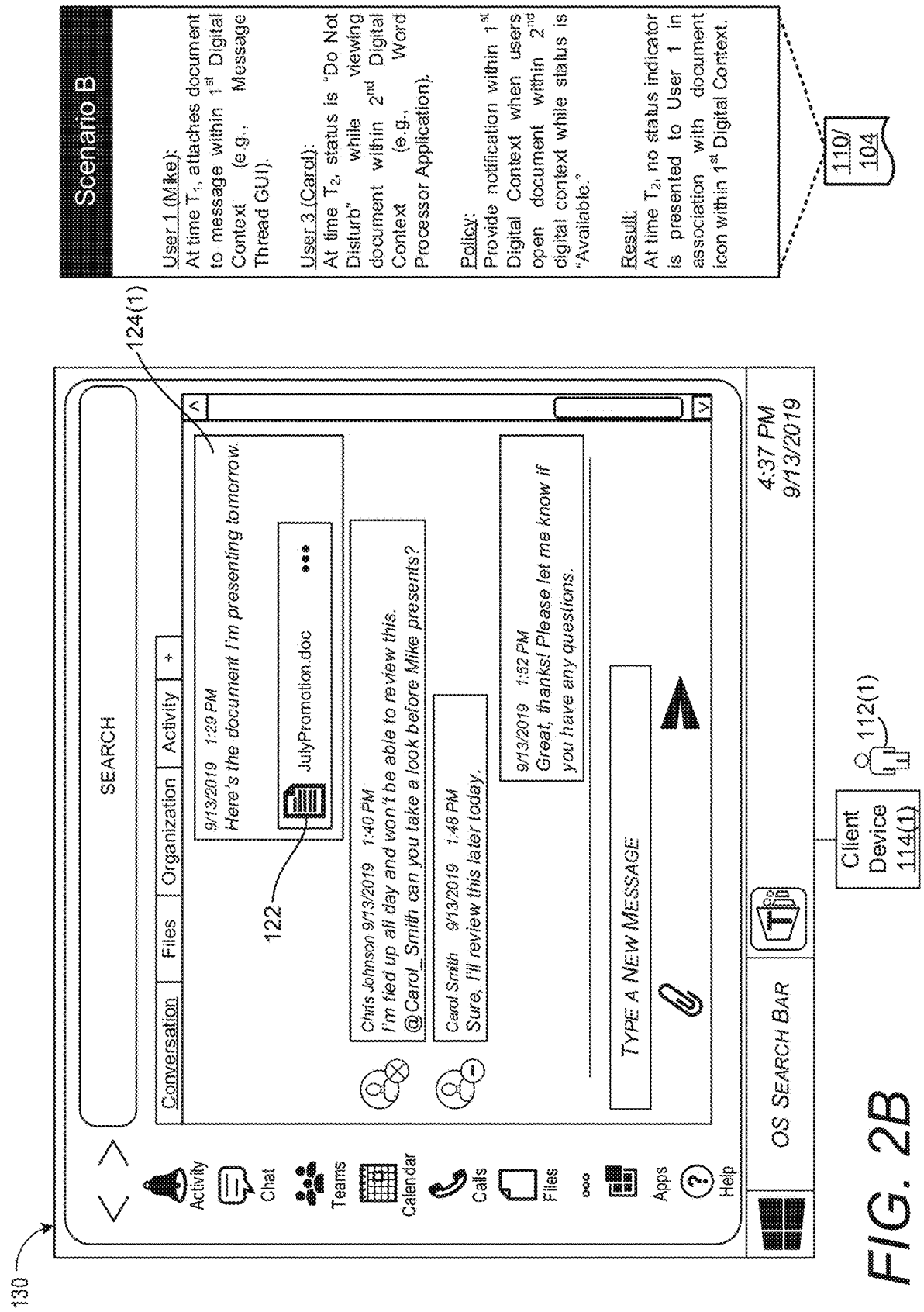
FIG. 2B illustrates a scenario where a collaboration platform restricts certain forms of user activity from triggering a status indicator based on a current status of the user that performs the user activity.

In some configurations, the status indicator criteria 104 may restrict certain forms of user activity 110 from triggering a status indicator 128 based on a current status of the user that performs the user activity. FIG. 2B, in conjunction with FIG. 1, illustrates an example of such an embodiment. With respect to the user activity 110, scenario B differs from scenario A of FIG. 1A in that the current status of the third user 112(3) at time $T_2$ is "Do Not Disturb"—as opposed to "Available." With respect to the status indicator criteria 104, scenario B differs from scenario A in that the policy is designed to cause the system 100 to provide the status indicator 128 to users that are currently within the first digital context when another user opens the data object 116 for viewing within a second digital context and that other user has a current status of "Available." Thus, even though the third user begins viewing the document within the second digital context at time $T_2$, the third user having a status of "Do Not Disturb" at time $T_2$ prevents the system 100 from presenting any status indicator 128 to the first user 112(1) within the first digital context.

Figure 2C:
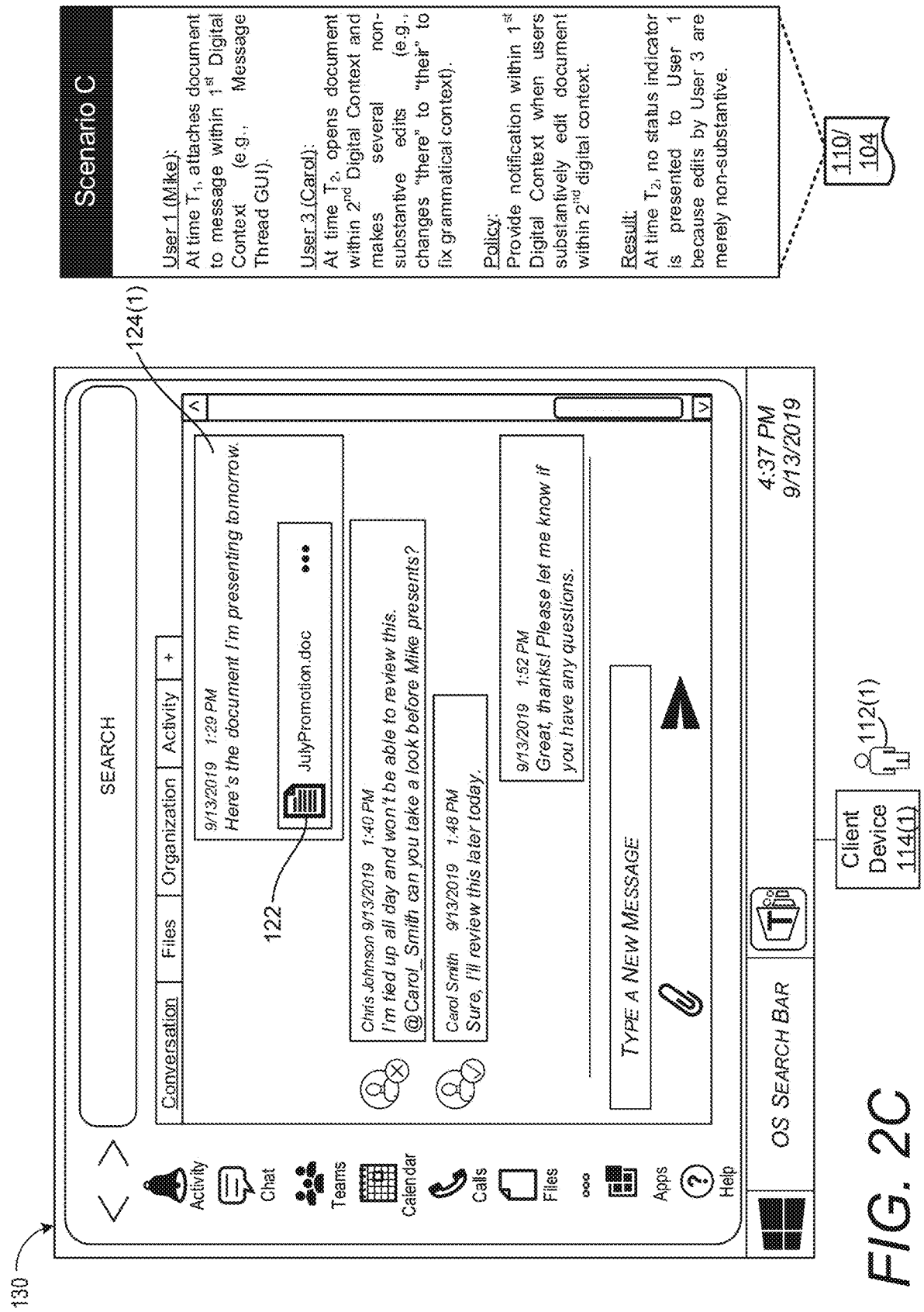
FIG. 2C illustrates a scenario where status indicator criteria defines identifiable characteristics for certain forms of user activity that are to trigger and/or prevent exposure of a status indicator.

In some configurations, the status indicator criteria 104 may define identifiable characteristics for certain forms of user activity 110 that are to trigger and/or prevent exposure of a status indicator 128. FIG. 2C, in conjunction with FIG. 1, illustrates an example of such an embodiment. With respect to the user activity 110, scenario C differs from scenario A of FIG. 1A in that at time $T_2$ the third user 112(3) begins making several edits to the data object 116 within the second digital context and various characteristics of these edits result in the system 100 classifying them as non-substantive. For example, the third user 112(3) may have made an edit to change the word "there" to "their" within the phrase "The kids all loved their new kindergarten teacher!" With respect to the status indicator criteria 104, scenario C differs from scenario A in that the policy is designed to cause the system 100 to provide the status indicator 128 to users that are currently within the first digital context when another user makes substantive edits to the data object 116 within a second digital context. Thus, even though the third user opens the document within the second digital context at time $T_2$ and even begins editing the document, the system 100 analyzing these edits and determining that the edits lack identifiable characteristics of substantive edits prevents the system 100 from presenting any status indicator 128 to the first user 112(1) within the first digital context. In contrast, if the third user 112(3) had instead deleted and/or added a large amount of text, the system 100 may have presented a stratus indicator 128 to the first user 112(1) within the first digital context.

Figure 2D:
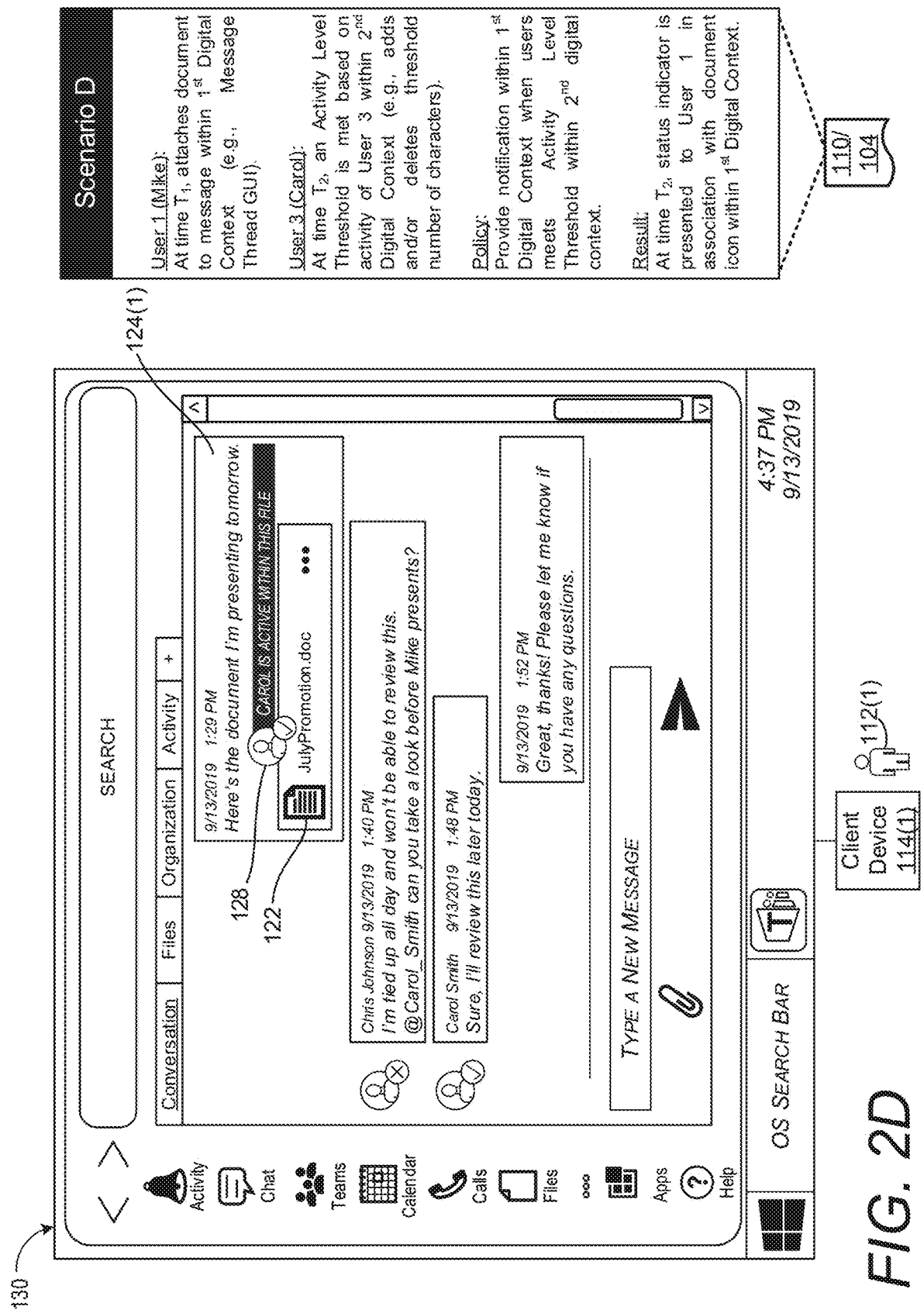
FIG. 2D illustrates a scenario where the status indicator criteria defines one or more threshold activity levels for certain forms of user activity that are to trigger exposure of a status indicator.

In some configurations, the status indicator criteria 104 may define one or more threshold activity levels for certain forms of user activity 110 that are to trigger exposure of a status indicator 128. FIG. 2D, in conjunction with FIG. 1, illustrates an example of such an embodiment. With respect to the user activity 110, in scenario D time $T_2$ represents the moment at which the user activity 110 that specifically corresponds to the third user 112(3) and that occurs within the second digital context with respect to the data object 116 reaches a threshold activity level. For example, the third user 112(3) may have opened the data object 116 using a word processing application at some threshold amount of time prior to $T_2$ such that at time $T_2$ the amount of time the data object 116 has been open reaches (e.g., satisfies) this threshold level. As another example, time $T_2$ may correspond to the moment at which an amount of editing performed by the third user 112(3) with respect to the data object 116 reaches a threshold level of editing. Exemplary forms of measurement for a threshold level of editing include, but are not limited to, a user performing editing for a predetermined amount of time, a user adding a predetermined number of characters, a user deleting a predetermined number of characters, an aggregate amount of added and deleted characters reaching a predetermined number, a user editing a predetermined percentage of a data object 116 (e.g., 10% document editing being satisfied if a user adds and/or deletes 100 characters of a 1000 character file), and any other suitable form of quantifiably measuring edits. As another example, time $T_2$ may correspond to the moment at which a threshold level of comments is attached by the third user 112(3) to one or more portions of the data object 116. It will be appreciated that many content viewing and/or editing applications enable users to add and/or reply to comments that appear inside balloon type comment fields without changing the main content of a data object. With respect to the status indicator criteria 104, scenario D differs from scenario A in that the policy is designed to cause the system 100 to provide the status indicator 128 to users that are currently within the first digital context when user activity 110 that is performed by another user reaches a predefined threshold level. Thus, because time $T_2$ represents the moment at which the user activity 110 that specifically corresponds to the third user 112(3) reaching the threshold activity level, the system 100 causes the status indicator 128 to be presented to the first user 112(1) as illustrated in FIG. 2D. In some implementations, the status indicator 128 may include an indication of an activity level of a particular user whose user activity 110 triggered the status indicator 128. For example, in the illustrated scenario, the status indicator 128 includes the text "CAROL IS ACTIVE WITHIN THIS FILE" to provide the first user with additional insight as to what has triggered the status indicator 128.

In some configurations, the status indicator criteria 104 may define one or more threshold activity levels for certain forms of user activity 110 that are to prevent exposure of a status indicator 128. For example, consider a scenario in which the status indicator 128 is being displayed to the first user 112(1) in response to the third user 112(3) having opened the data object 116. Further consider that the third user 112(3) leaves the data object 116 open on the third client device 114(3) but remains inactive with respect to the file for some predetermined amount of time. For example, suppose that the third user 112(3) goes home for the night but leaves her computer on with the data object 116 open. In such a scenario, the status indicator criteria 104 may define a threshold inactivity levels for preventing the display of the status indicator. For example, if the third user 112(3) opens the data object 116 open in a word processor application, thereby triggering the status indicator to be displayed to the first user 112(1), but then remains inactive for a predetermined amount of time (even while the data object remains open) then the system 100 may identify this level of inactivity and may automatically cause the first client device 114(1) to stop displaying the status indicator 128.

Figure 2E:
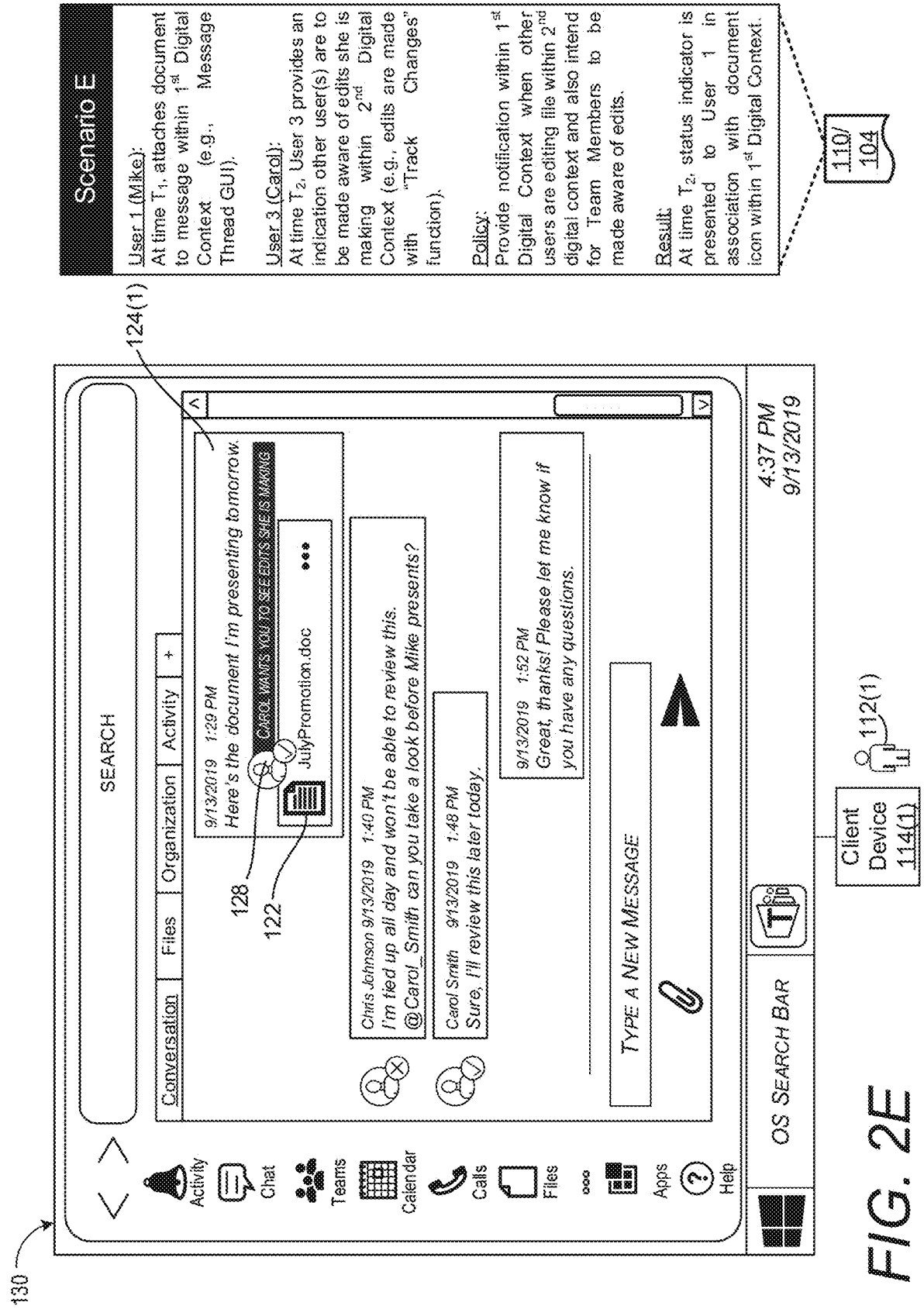
FIG. 2E illustrates a scenario where the status indicator criteria defines identifiable characteristics for user activity that may be performed to specifically attract the attention of one or more other users.

In some configurations, the status indicator criteria 104 may define identifiable characteristics for user activity 110 that is being performed to specifically attract the attention of one or more other users. Accordingly, in such configurations, user activity 110 that satisfies such status indicator criteria 104 may result in a status indicator 128 being presented to a user within an appropriate digital context. FIG. 2E, in conjunction with FIG. 1, illustrates an example of such an embodiment. With respect to the user activity 110 of scenario E, at time $T_2$ the user activity 110 includes the third user 112(3) making edits to the content of the data object 116 in a particular manner so as to make those edits conspicuous to other users. For example, the third user 112(3) may turn on a particular feature of an application through which edits are made such as, for example, a "Track Changes" feature that is specifically designed to make edits to a file highly conspicuous to other users. As another example, the third user 112(3) may provide an indication that a specific user is to be made aware of the edits (e.g., by @mentioning the first user). In such cases, a status indicator may be displayed only to a specific user when the user activity that is triggering the status indicator includes an identification of the specific user. For example, the third user 112(3) whom is making edits to a data object 116 may add a comment to the data object that specifically identifies the first user 112(1) based on a username, an email address, or any other suitable identification. With respect to the status indicator criteria 104, scenario E differs from scenario A in that the policy is designed to cause the system 100 to provide the status indicator 128 to users that are currently within the first digital context when user activity 110 that is performed by another user includes the identifiable characteristics indicating that the user activity 110 is being performed to specifically attract the attention of one or more other users. Thus, because time $T_2$ represents the moment at which the third user 112(3) provides the indication that other users are to be made aware of edits (e.g., by making the edits with "Track Changes" turned on), the system 100 causes the status indicator 128 to be presented to the first user 112(1) as illustrated in FIG. 2E. In some implementations, the status indicator 128 may include an indication of that edits are being made in a conspicuous manner. For example, in the illustrated scenario, the status indicator 128 includes the text "CAROL WANTS YOU TO SEE EDITS SHE IS MAKING" to provide the first user with additional insight as to what has triggered the status indicator 128.

Figure 2F:
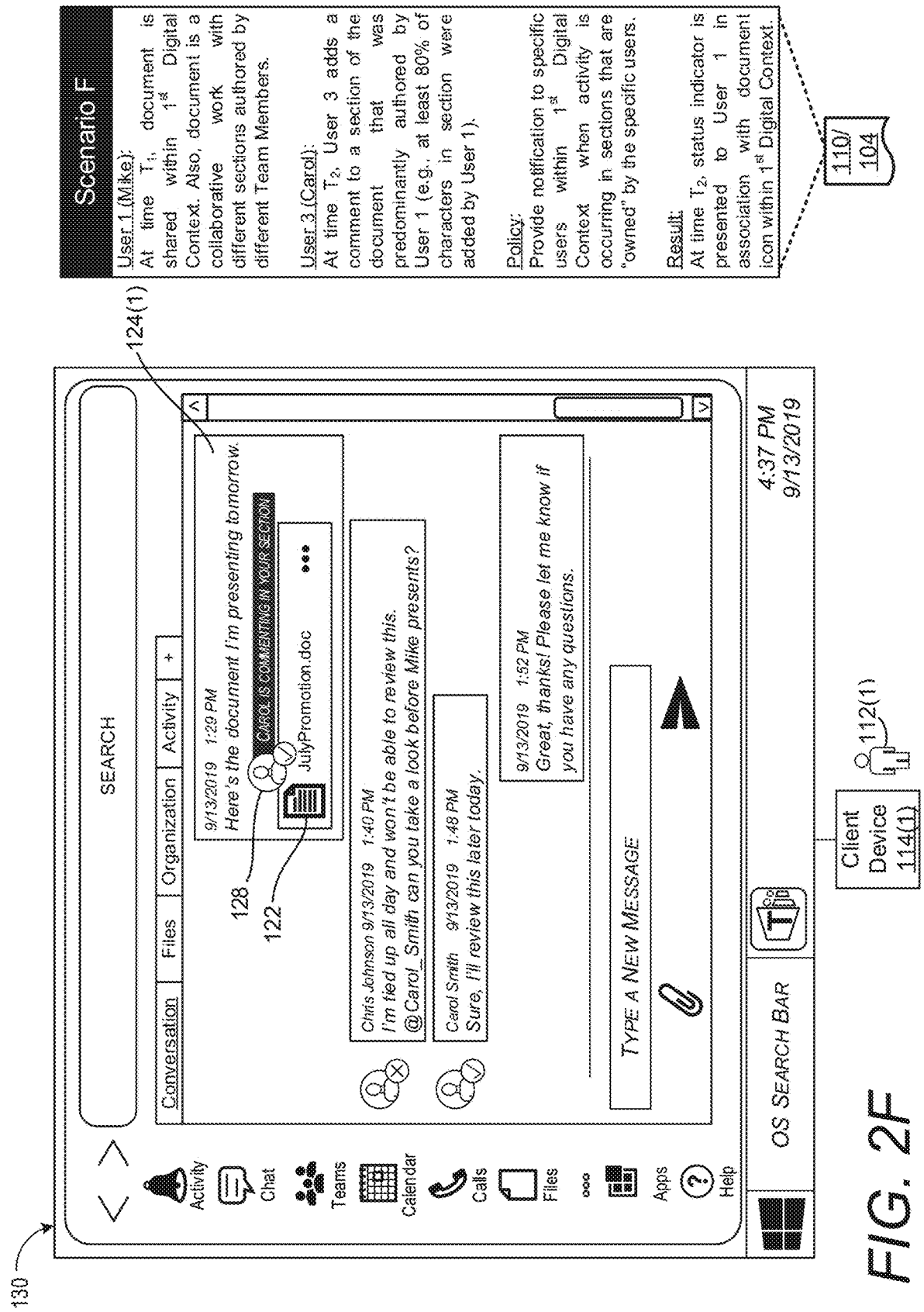
FIG. 2F illustrates a scenario where the status indicator criteria prescribes that a status indicator be displayed to a particular user when certain forms of user activity occurs with respect to portions of content that are associated with that particular user.

In some configurations, the status indicator criteria 104 may prescribe that a status indicator 128 be displayed to a particular user when certain forms of user activity 110 occurs with respect to portions of content that are associated with that particular user. FIG. 2F, in conjunction with FIG. 1, illustrates an example of such an embodiment. With respect to the user activity 110 of scenario F, at time $T_2$ the user activity 110 includes the third user 112(3) interacting with a section of a data object 116 that is associated with the first user 112(1). For example, the third user 112(3) may add a comment to a specific portion of the data object that the first user 112(1) has a threshold contribution level with respect to (e.g., due to the first user adding 80% or more other characters of that section) With respect to the status indicator criteria 104, scenario F differs from scenario A in that the policy is designed to cause the system 100 to provide the status indicator 128 to specific users when other users interact with portions of a data object that are "owned" by the specific users. Thus, because time $T_2$ represents the moment at which the third user 112(3) adds a comment to the section that was predominantly authored by the first user 112(1), the system 100 causes the status indicator 128 to be presented to the first user 112(1) as illustrated in FIG. 2F. In some implementations, the status indicator 128 may include an indication that user activity 110 is occurring in a section of the document that corresponds to a particular user. For example, in the illustrated scenario, the status indicator 128 includes the text "CAROL IS COMMENTING IN YOUR SECTION" to provide the first user with additional insight as to what has triggered the status indicator 128.

Figure 3:
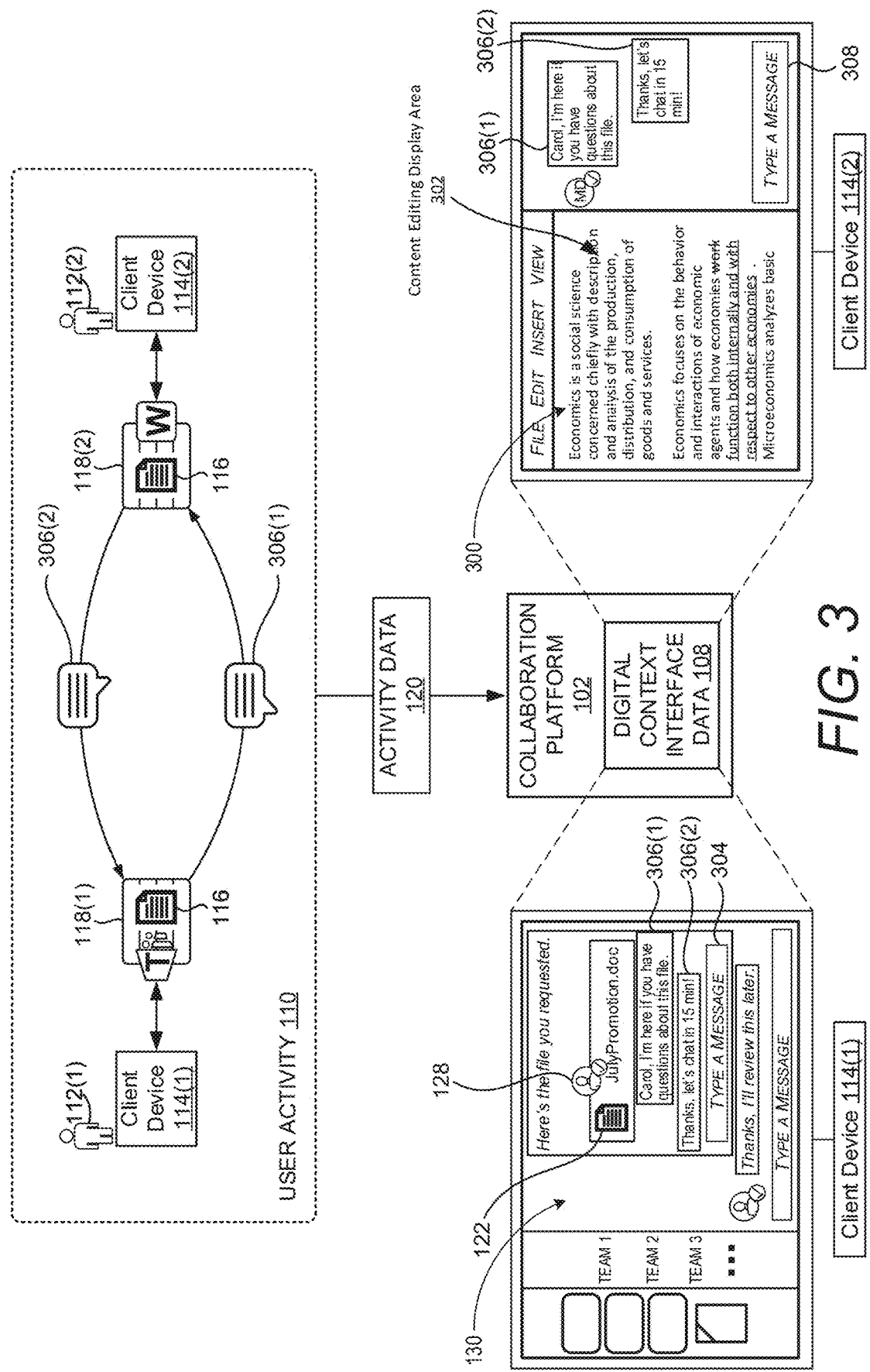
FIG. 3 illustrates another example scenario involving messages being transmitted between different digital contexts for illustrating aspects of the present disclosure.

FIG. 3 illustrates another example scenario involving messages 124 being transmitted between different digital contexts 118 for illustrating aspects of the present disclosure. In this example, the collaboration platform 102 may analyze user activity 110 to determine when to display a status indicator 128 to a first user 112(1) in response to certain user activity 110 that is being performed by a second user 112(2). For example, as illustrated in FIG. 3, the digital context interface data 108 (which as described above in relation to FIG. 1 may have been updated based on status indicator data 106) may cause the status indicator 128 to be displayed within the first digital context 118(1) in association with an icon 122 that is representative of the data object 116. Then, upon being provided with the status indicator 128, the first user 112(1) (e.g., the "recipient") is also provided with an ability to perform one or more appropriate actions such as, for example, transmitting a message to the second user 112(2).

As illustrated, the collaboration platform 102 is providing digital context interface data 108 to each of the first client device 114(1) and a second client device 114(2). Furthermore, the digital context interface data 108 that is provided to the first client device 114(1) causes a graphical user interface (GUI) to be displayed that specifically corresponds to a first digital context 118(1) whereas the digital context interface data 108 that is provided to the second client device 114(2) causes a different GUI to be displayed that specifically corresponds to a second digital context 118(2). For purposes of the present discussion, the GUI that is associated with the first digital context 118(1) is the message thread GUI 130 in the GUI that is associated with the second digital context 118(2) is a word processing GUI 300 that enables the second user 112(2) to edit content of the data object 116 within a content editing display area 302.

As further illustrated, the digital context interface data 108 causes the first client device 114(1) to display a cross-context message generation field 304 that enables the first user 112(1) to transmit one or more messages 306 to the second user 112(2) within the second digital context 118(2) directly from the first digital context 118(1). For example, as illustrated, the first user 112(1) has utilized the cross-context message generation field 304 to generate a first message 306(1) that recites "Carol, I'm here if you have questions about this file." After having generated the first message 306(1), the first user 112(1) may "send" this message to cause the content thereof to be displayed to the second user 112(2) directly within the GUI that is associated with the second digital context 118(2). Thus, in the illustrated example, the first message 306(1) that recites "Carol, I'm here if you have questions about this file" is being displayed within the word processor GUI 300. In this way, the first user 112(1) is provided with an ability to efficiently establish a communication protocol with the second user 112(2) at an appropriate time (e.g., immediately upon receiving the status indicator 128 indicating when the second user 112(2) begins interacting with the data object 116) and without having to switch his or her digital context with respect to the data object 116.

In some embodiments, upon receiving the first message 306(1) that was generated within the first digital context 118(1), the digital context interface data 108 may cause another cross-context message generation field 308 to be displayed within the second digital context 118(2). Similar to the context message generation field 304, this other context message generation field 308 enable the second user 112(2) to transmit one or more messages 306 to the first user 112(1) within the first digital context 118(1) directly from the second digital context 118(2). For example, as illustrated, the second user 112(2) has utilized the cross-context message generation field 308 to generate a second message 306(2) that recites "Thanks, let's chat in 15 min!" After having generated the second message 306(2), the second user 112(2) may "send" this message to cause the content thereof to be displayed to the first user 112(1) directly within the GUI that is associated with the first digital context 118(1). Thus, in the illustrated example, the second message 306(2) that recites "Thanks, let's chat in 15 min!" is being displayed within the messaging thread GUI 130. In this way, the second user 112(2) is provided with an ability to efficiently reply to the first user 112(1) after having received the first message 306(1) without having to switch his or her digital context with respect to the data object 116.

Figure 4A:
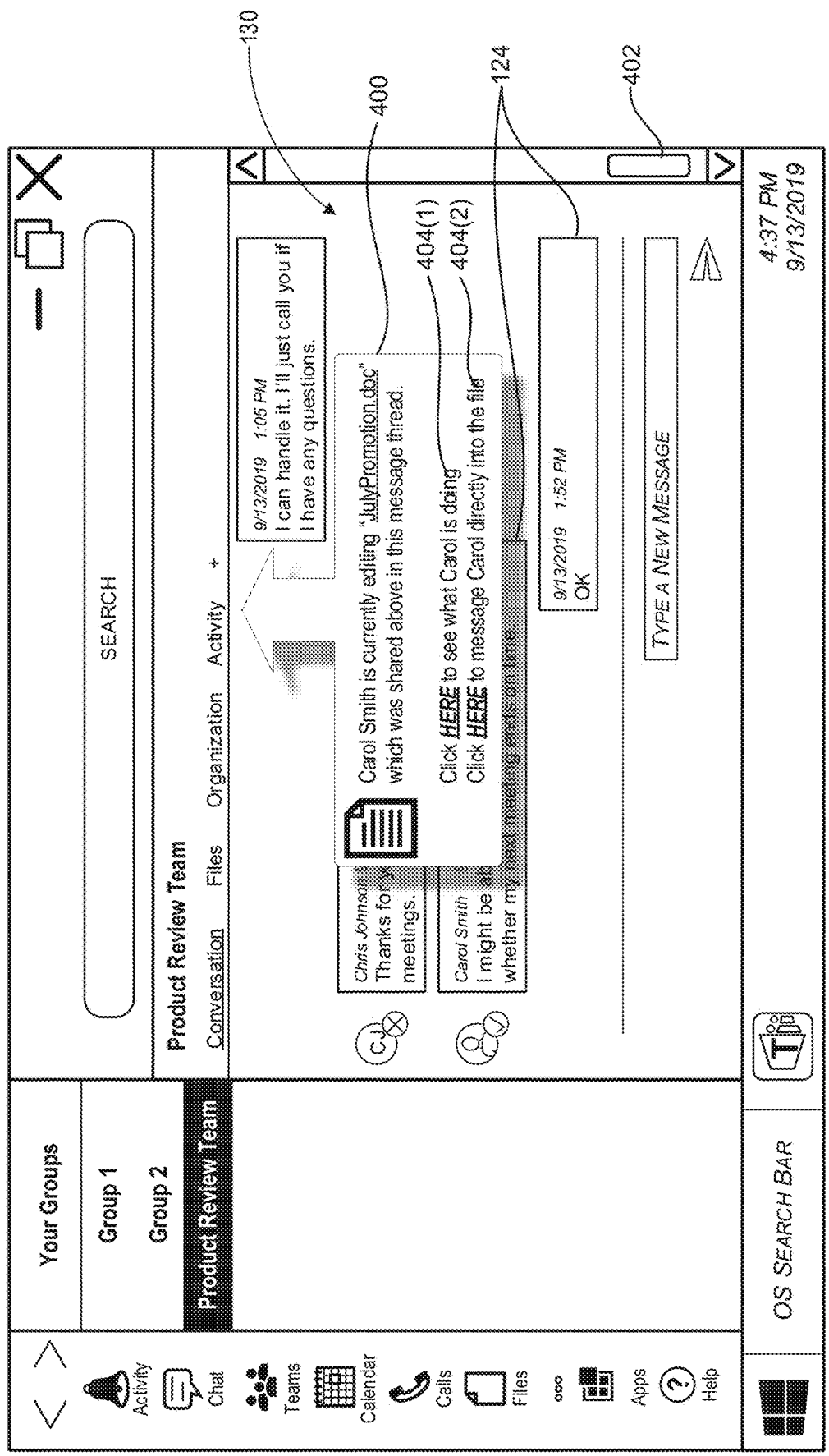
FIG. 4A illustrates an exemplary status indicator that can be presented to a user in response to status indicator criteria being satisfied.
Figure 4B:
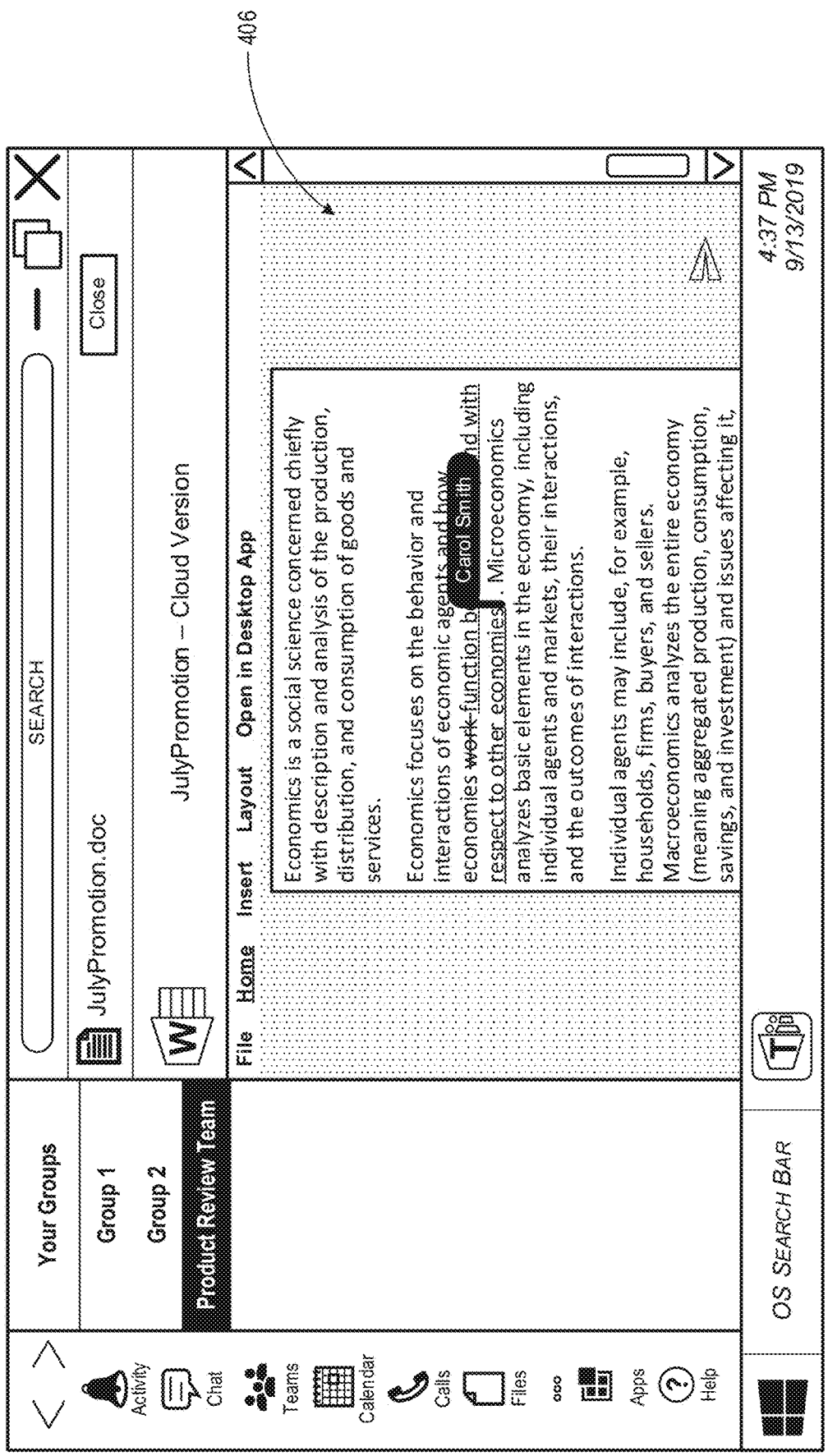
FIG. 4B shows an exemplary preview mode GUI that can be displayed in response to the user selecting a user interface element that is shown in FIG. 4A.
Figure 4C:
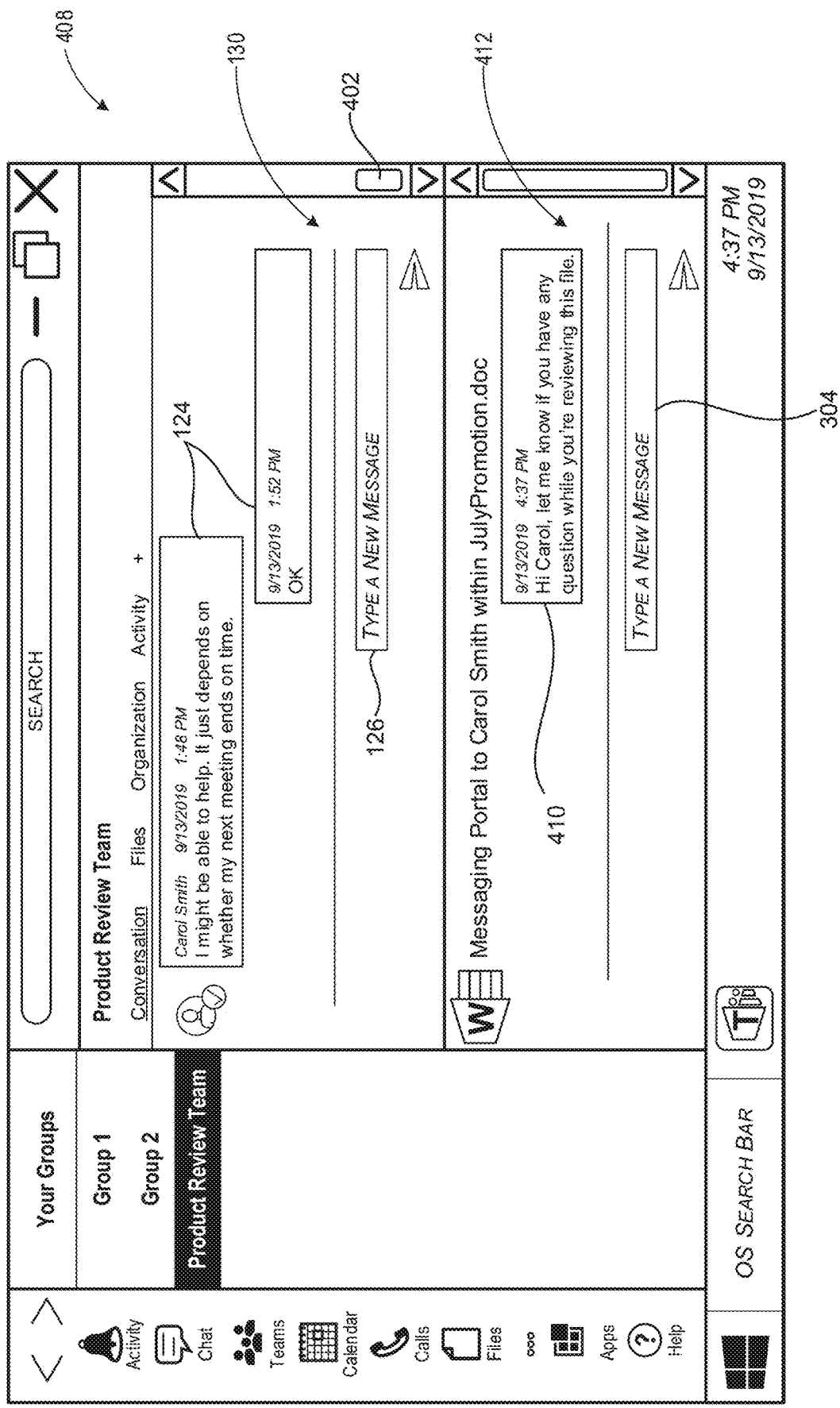
FIG. 4C shows an exemplary cross-context messaging GUI that can be displayed in response to the user selecting another user interface element that is shown in FIG. 4A.

FIGS. 4A through 4C illustrate various aspects of exemplary GUIs that can be displayed in association with the technologies described herein. In particular, FIG. 4A illustrates an exemplary status indicator 400 that can be presented to a user in response to status indicator criteria 104 being satisfied. As illustrated, the status indicator 400 is being presented within a message thread GUI 130 to indicate that user activity is currently occurring with respect to a data object that was previously shared via the message thread GUI 130. As further illustrated, a plurality of messages 124 have been written by various users into the message thread GUI 130 since the data object was previously shared therein—the result being that this particular message may no longer be visible when a user is viewing the most recently added messages 124. For example, the user that is currently viewing the message thread GUI 130 shown in FIG. 4A may have a slider bar positioned to a lower extreme to show only the most recent four messages 124. In the illustrated embodiment, the status indicator 400 is in the form of a graphical element that becomes temporarily superimposed over the user's current view of the message thread GUI 130 to inform the user of user activity that is occurring with respect to a data object that was previously shared without changing the current position that the user has selected within this message thread GUI 130 (e.g., by positioning the slider bar 402).

In some implementations, the status indicator 400 may be temporarily superimposed over the user's current view of the message thread GUI 130 for a predetermined amount of time (e.g., 10 seconds, etc.).

In some embodiments, the status indicator 400 includes one or more user interface elements 404 that serve as an embedded control that is selectable to perform one or more computing actions that become available to a recipient upon receipt of the status indicator 400. As described above, the one or more computing actions may be prescribed by available action parameters 104C that indicate various factors such as, for example, a current status of a particular user 112 who's corresponding user activity 110 resulted in the status indicator 128 being provided to the recipient, a current status of the recipient of the status indicator 128, a current digital context of a particular user 112 who's corresponding user activity 110 resulted in the status indicator 128 being provided to the recipient, and/or a current digital context of the recipient of the status indicator 128. In some embodiments, the recipient of the status indicator 400 may be provided with an ability to toggle her current digital context into a preview mode that shows the user activity that triggered the status indicator 400. For example, the first user interface element 404(1) recites "Click HERE to see what Carol is doing." Additionally, or alternatively, the recipient of the status indicator 400 may be provided with an ability to send messages that transcend digital contexts (e.g., a message may be generated within a fist digital context 118(1) and may be transmitted to a second digital context 118(2)). For example, the second user interface element 404(2) recites "Click HERE to message Carol directly into the file."

FIG. 4B shows an exemplary preview mode GUI 406 that can be displayed in response to the user selecting the first user interface element 404(1) shown in FIG. 4A. In the illustrated example, the preview mode GUI 406 is displayed within a portion of a display area within which the message thread GUI 130 was previously displayed as shown in FIG. 4A. The exemplary preview mode GUI 406 may be configured to mimic a particular digital context within which the user activity that triggered the status indicator 400 occurred. For example, under circumstances in which the status indicator 400 is presented within a first digital context 118(1) in response to user activity occurring within a second digital context 118(2), the preview mode GUI 406 may be configured such that various graphical aspects of the second digital context 118(2) appear within the preview mode GUI 406. In the specific but nonlimiting example that is specifically illustrated in FIG. 4B, the preview mode GUI 406 is configured to show graphical aspects of a word processing application within which a user named "Carol Smith" is activity editing the data object in a manner that triggered the status indicator 400.

FIG. 4C shows an exemplary cross-context messaging GUI 408 that can be displayed in response to the user selecting the second user interface element 404(2) shown in FIG. 4A. In the illustrated example, the cross-context messaging GUI 408 includes a message generation field 126 for typing and/or dictating message content in association with a persistent workplace chat as represented by the messaging thread GUI 130. Thus, by using the message generation field 126, a user may generate and transmit messages 124 in association with the persistent workplace chat so that any other members of this persistent workplace chat receive and retain continued access to such messages. Exemplary such persistent workplace chats include, but are not limited to, a conversation thread within the MICROSOFT TEAMS collaboration platform, a SLACK conversation object, or any other type of multi-user persistent chat system.

As further illustrated, the exemplary cross-context messaging GUI 408 includes a cross-context message generation field 304 that enables the recipient of the status indicator 400 to generate message content 410 within the first digital context 118(1) and also to have this message content displayed to another user within a second digital context 118(2) as described in relation to FIG. 3. As illustrated, in some embodiments, the exemplary cross-context messaging GUI 408 includes both the messaging thread GUI 130 that displays persistent messages 124 associated with a persistent workplace chat and also a messaging portal GUI 412 that displays one or more cross-context messages 410 that are transmitted directly to whichever user's activity triggered the status indicator 400 and within whatever context that user's activity occurred. In this way, the recipient of the status indicator 400 is able to seamlessly communicate both: (i) widely with the entire group of users that are associated with the persistent workplace chat shown in the message thread GUI 130, and (ii) pointedly with the specific user(s) that performed that user activity which triggered the status indicator 400.

Figure 5A:
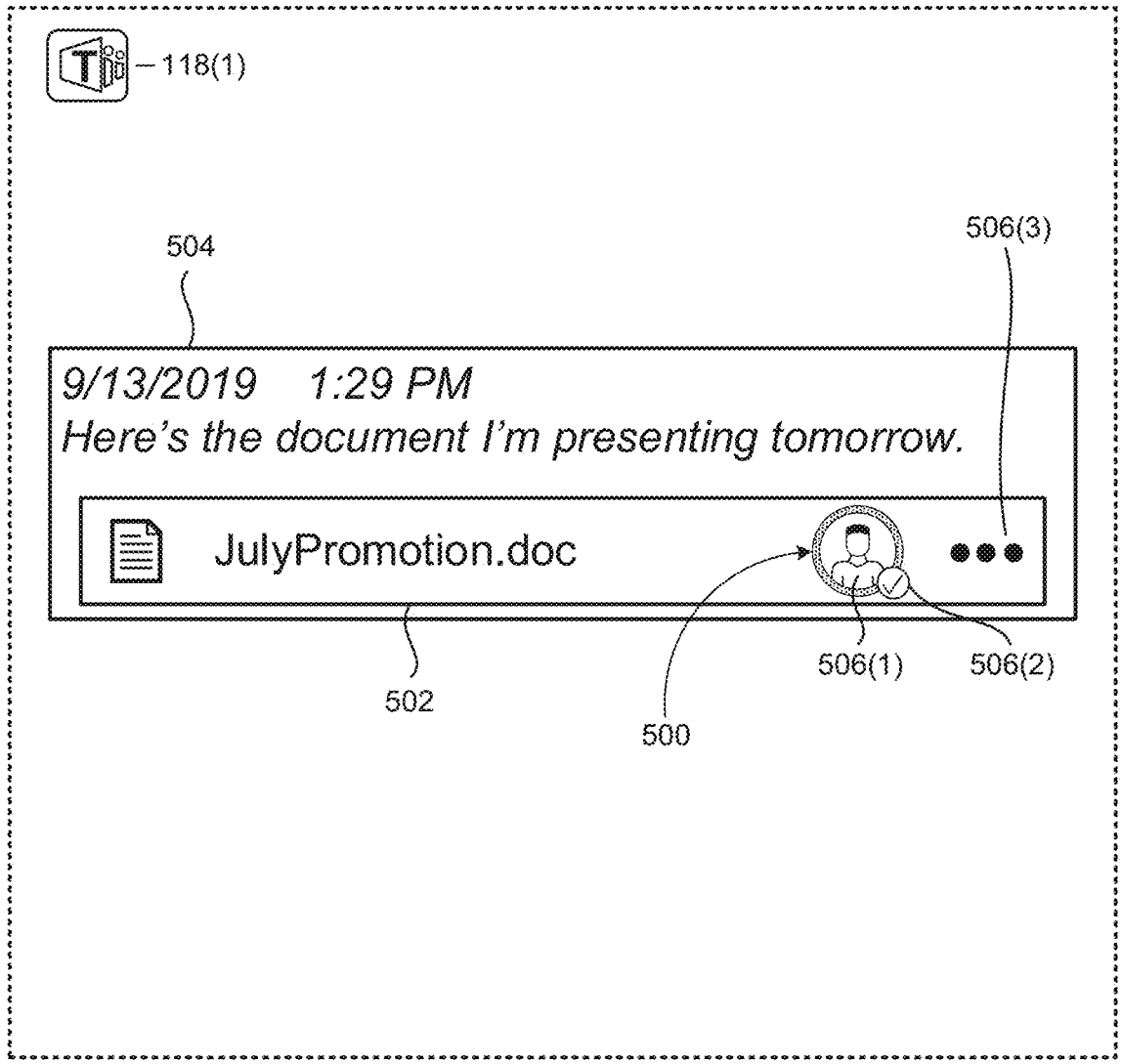
FIG. 5A shows an exemplary status indictor that can be displayed in response to user activity satisfying one or more status indicator criteria.

FIG. 5A shows an exemplary status indictor 500 that can be displayed in response to user activity 110 satisfying one or more status indicator criteria 104. As illustrated, the status indicator 500 is displayed in association with an icon 502 that represents a data object. Here, the icon 502 represents a document-type data object that is entitled "JulyPromotion.doc" and that was shared within a message 504. This example is for illustrative purposes only.

In some embodiments, the status indicator 500 may include multiple graphical aspects 506 that represent multiple layers of information. As illustrated, the status indicator 500 includes a first graphical aspect 506(1) that represents an identity of a particular user 112 who's user activity 110 satisfies the status indicator criteria 104 thereby triggering presentation of the status indicator 500. For example, the first graphical aspect 506(1) may be an avatar or photograph of the particular user 112. As further illustrated, the status indicator 500 includes a second graphical aspect 506(2) that represents a current status of the particular user 112 who's user activity 110 satisfies the status indicator criteria 104. For example, the second graphical aspect 506(2) may be an "Available" symbol that indicates that the particular user 112 is currently free to accept messages, calls, or other forms of communications. As further illustrated, the status indicator 500 includes a third graphical aspect 506(3) that serves as an embedded control that is selectable (e.g., by clicking on the third graphical aspect 506(3)) to initiate any computing actions that are being made available by the collaboration platform to a recipient of the status indicator in response to the monitored user activity satisfying the status indicator criteria. Here, the presence of the three-dot symbol within the status indicator 500 serves as an indication that one or more computing actions are being made available to the recipient. As used herein, an aspect of the status indicator including an "embedded control" refers to that aspect of the status indicator being selectable by a recipient of the status indicator to initiate one or more computing actions or to expose one or more graphical elements that are designed to facilitate one or more computing actions. For example, in some embodiments, a status indicator may include an embedded control that is selectable to expose a cross-context message generation field 304.

Figure 5B:
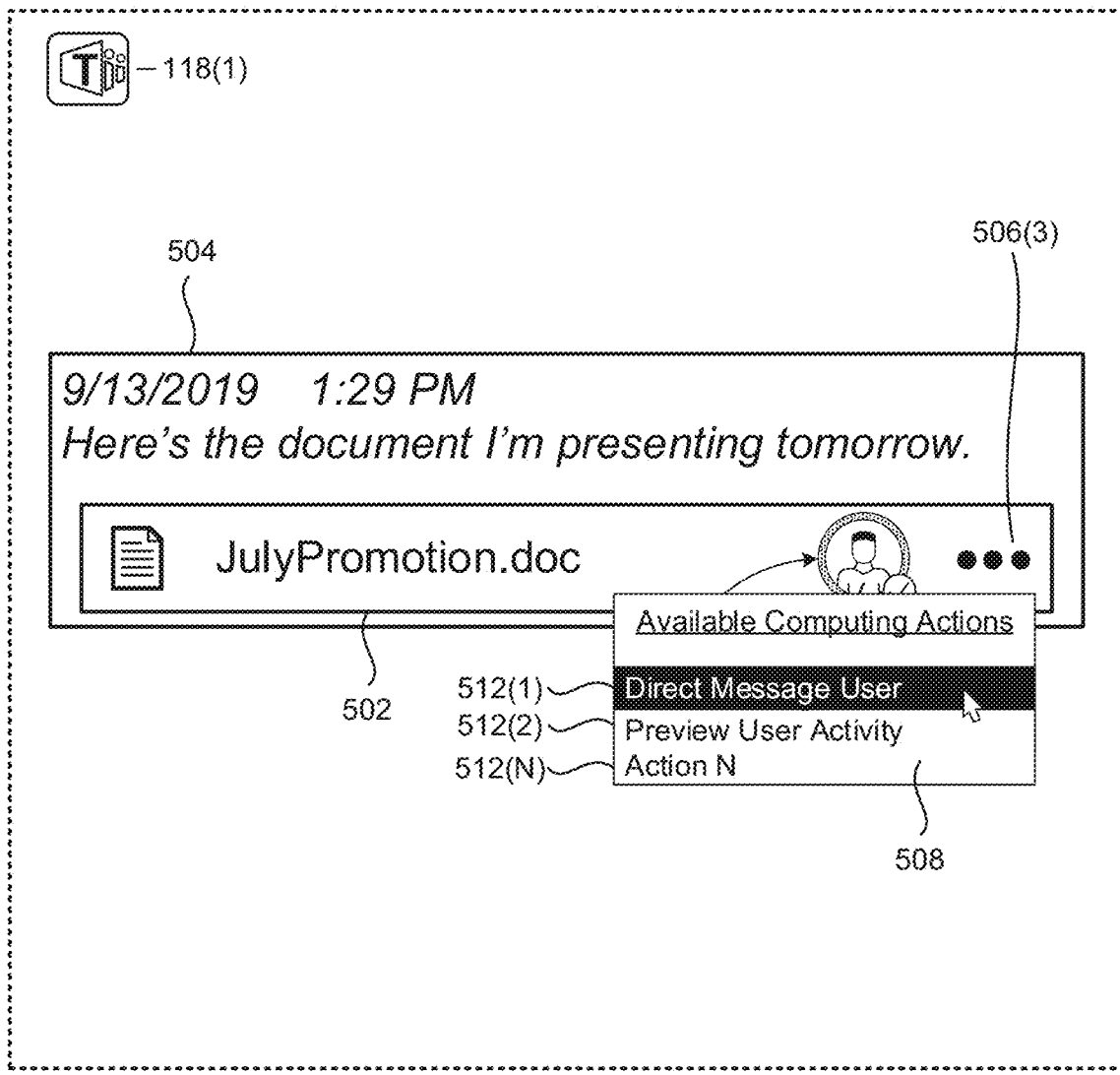
FIG. 5B shows an exemplary menu that can be displayed to the recipient of the status indicator to enable the recipient to select individual ones of the available computing actions.

FIG. 5B shows an exemplary menu 508 that can be displayed to the recipient of the status indicator 500 to enable the recipient to select individual ones of the available computing actions. In some embodiments, the menu 508 may be exposed to the recipient in response to a pointer element 510 being placed over the third graphical aspect 506(3). Exemplary computing actions that can be made available to the recipient include, entering a preview mode to view the activity that triggered the status indicator 500, sending a message to the user who's activity triggered the status indicator, and so on. In the specifically illustrated scenario, the recipient is selecting a particular user interface element 512(1) to generate a cross-context message that will be transmitted directly to the particular user within the specific digital context in which the status indicator triggering activity occurred.

Figure 5C:
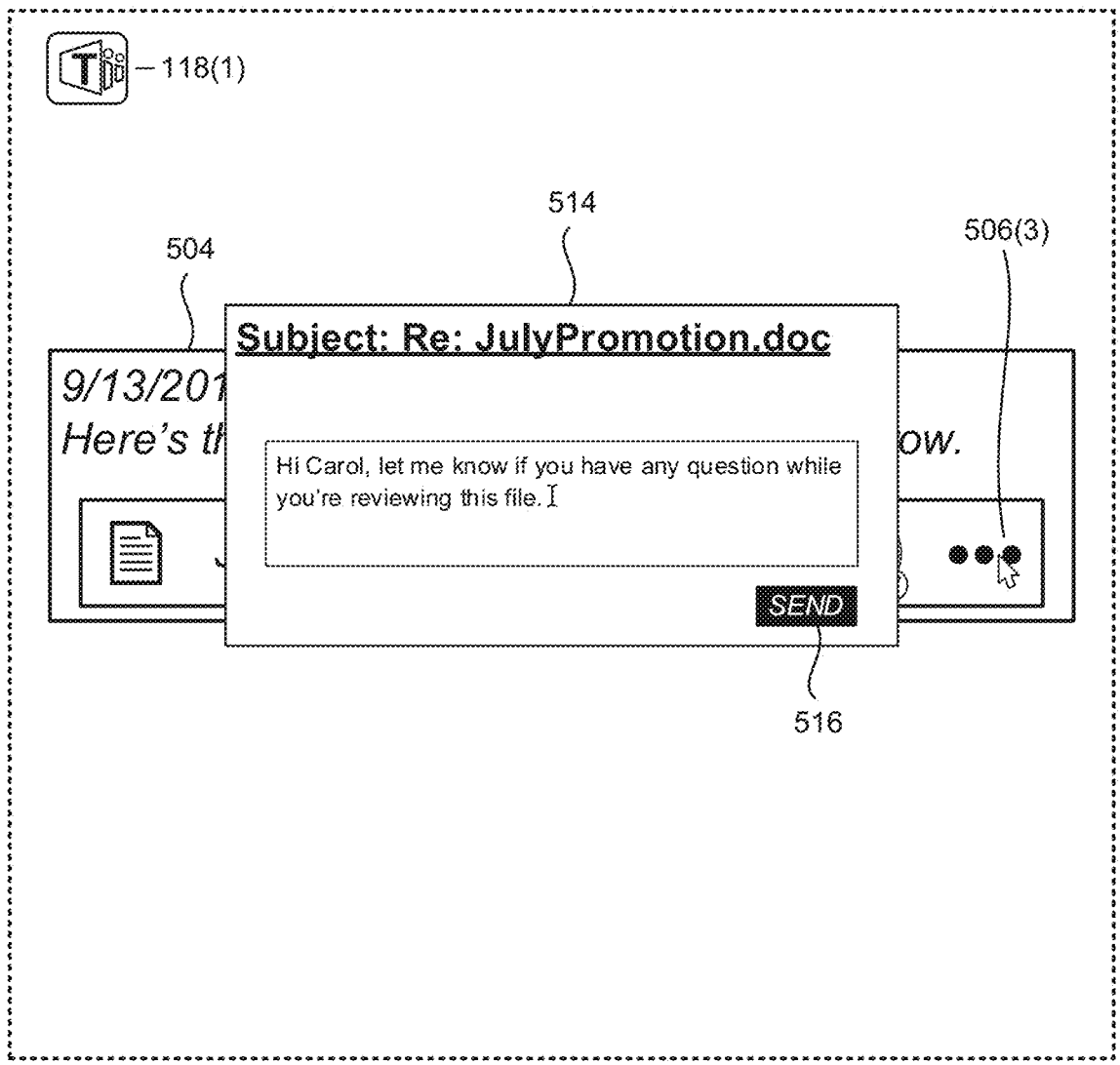
FIG. 5C illustrates an exemplary message generation GUI that can be displayed in response to selection of a user interface element associated with the status indicator of FIG. 5A.

FIG. 5C illustrates an exemplary message generation GUI 514 that can be displayed in response to selection of the particular user interface element 512(1). In some embodiments, the system 100 automatically populates one or more aspects of a message based on various factors associated with generation of the status indicator 500. For example, in the illustrated implementation, the system 100 has automatically populated a subject line of a message based on the title of the data object associated with the status indicator 500. Then, upon the recipient typing out a message body (e.g., "Hi Carol, let me know if you have any question while you're reviewing this file."), the recipient can then select a send button 516 to transmit the custom generated message and the automatically populated content to the particular user 112 who's user activity triggered the status indicator 500. In some embodiments, selecting the send button 516 may cause the system 100 to transmit an email message to the particular user 112. Additionally, or alternatively, selecting the send button 516 may cause the system 100 to transmit a pop-up message to the particular user 112—where the pop-up message automatically shows up superimposed over one or more graphics on a client device of the particular user 112.

Figure 6:
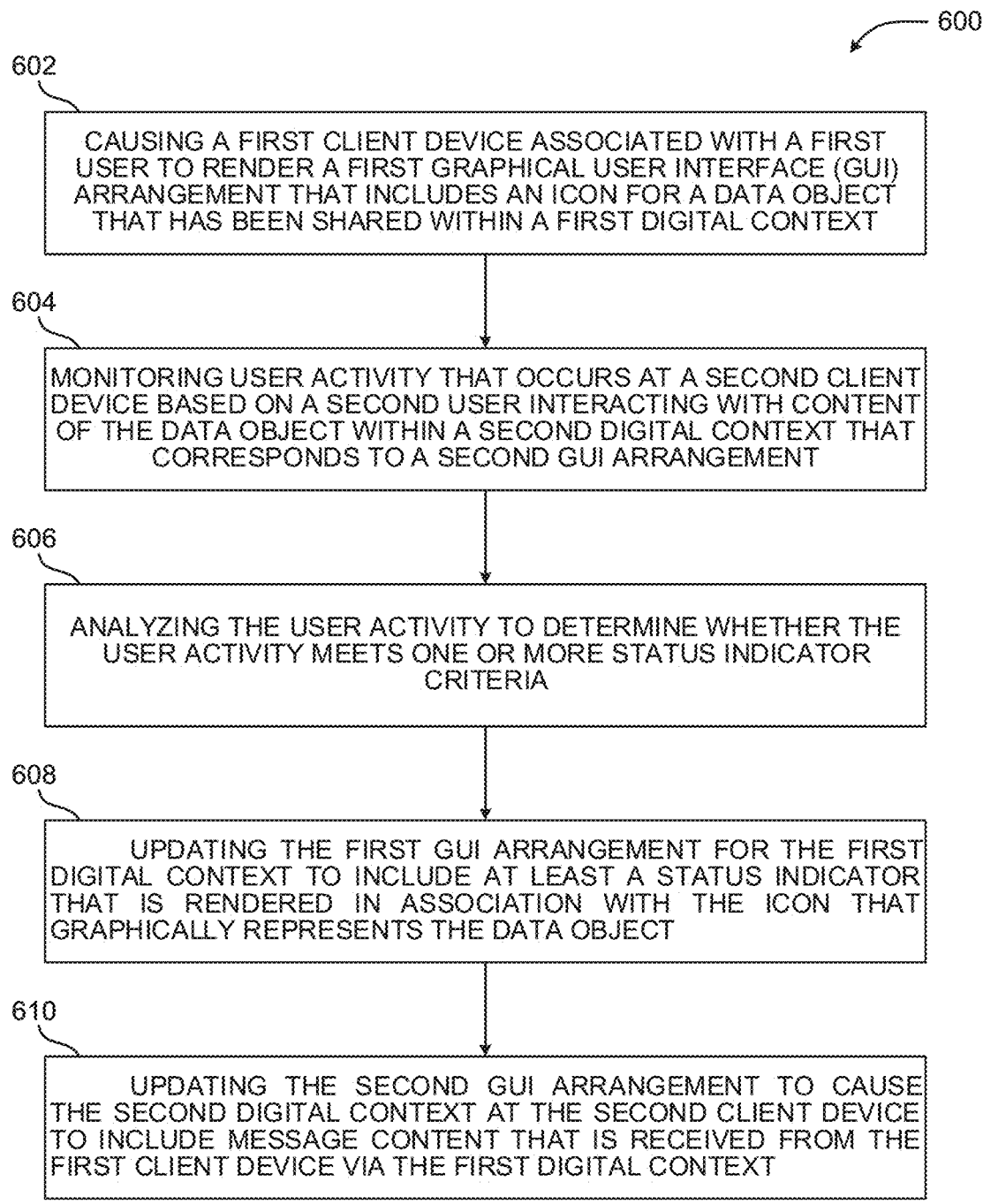
FIG. 6 is a diagram illustrating aspects of a routine for computationally efficient generation of status indicators that indicate when user activity occurs across different contexts.

FIG. 6 is a diagram illustrating aspects of a routine 600 for computationally efficient generation of status indicators that indicate when user activity occurs across different contexts. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 6 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, persistent chat sessions, video streams, images, virtual objects, and/or applications associated with a communication session.

The routine 600 starts at operation 602, where the system 100 causes a first client device that is associated with a first user to render a first GUI arrangement to facilitate a first digital context. For example, the system may provide digital context interface data 108 to the first client device to enable the first user to interact with a data object within a first digital context. For example, as described above, within this first digital context the first user may attach the data object to a message and then may cause this message to be transmitted to other users within this first digital context. An exemplary such first digital context is a persistent message chat interface within which a plurality of users can transcribe, read, and reply to messages. In accordance with various embodiments, the first GUI arrangement may include a graphical representation of the data object such as, for example, an icon that represents a file type of the data object and further includes a name of the data object. For example, as illustrated in FIGS. 1-3, the icon 122 may include a graphical representation of a "paper" document (e.g., due to the data object 116 being a word processing document with a file extension of ".doc") as well as a title of the document. Thus, at block 602 the first user may be described as being actively utilizing a collaboration platform within a first digital context.

The routine 600 proceeds to operation 604, where the system 100 monitors user activity that occurs at a second client device based on a second user interacting with content of the data object within a second digital context that corresponds to a second GUI arrangement. As a specific example, the second user may select the icon of the data object that is rendered within the first digital context to cause the second client device to open the data object within an application that is configured to enable editing of the content of the data object. Then, once the data object is open within the second digital context at the second client device, the system 100 actively monitors the user activity that the second user is performing with respect to the data object within this second digital context. For example, as described above, the system may monitor edits that are being performed by second user on the content of the data object.

Next, at operation 606, the system 100 analyzes the user activity to determine whether this monitored user activity meets one or more status indicator criteria. Stated alternatively, the system determines whether the status indicator criteria is satisfied by one or more actions that the second user performs with respect to the data object while interacting with the data object within the second digital context. A variety of different scenarios of determining whether the user activity satisfies the status indicator criteria are described in relation to FIGS. 1-5C. These scenarios represent exemplary scenarios only and provided merely for illustrative purposes. Thus, the status criteria may be defined and/or customized so that any suitable type of user activity results in a determination by the system of the status indicator criteria being satisfied.

Next, at operation 608, the system 100 causes the first GUI arrangement for the first digital context to include a status indicator that is rendered in association with the icon for the data object. For example, the system can update digital context interface data for the first client device to cause this first client device to render the status indicator over and/or adjacent to (or otherwise in association with) the icon. As described above, the status indicator may be designed to communicate to the first user various aspects of the user activity that is being performed by the second user and that satisfied the status indicator criteria. For example, the status indicator may be designed to communicate the identity of the second user. Additionally, or alternatively, the status indicator may be designed to communicate the type of activity that is being performed by the second user and which triggered the system to cause the status indicator to be displayed on the first client device.

As described above in more detail, in various embodiments the system 100 may also enable the first user to generate message content within the first digital context and have this message content displayed to the second user within the second digital context. For example, the system may cause a cross-context message generation field to be displayed to the first user within the first digital context. In this way, while within the first digital context, the first user may type or dictate (or otherwise provide) message content in association with the data object.

Next, at operation 610, the system 100 updates the second GUI arrangement to cause the second digital context at the second client device to include the message content that is received from the first client device via the first digital context. Thus, upon being provided with the status indicator that informs the first user of the user activity that is being performed by the second user within the second digital context, the first user is able to cause a message to be displayed to this second user directly within this second digital context—without the first user having to switch out of the first digital context within which the status indicator was provided.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 7:
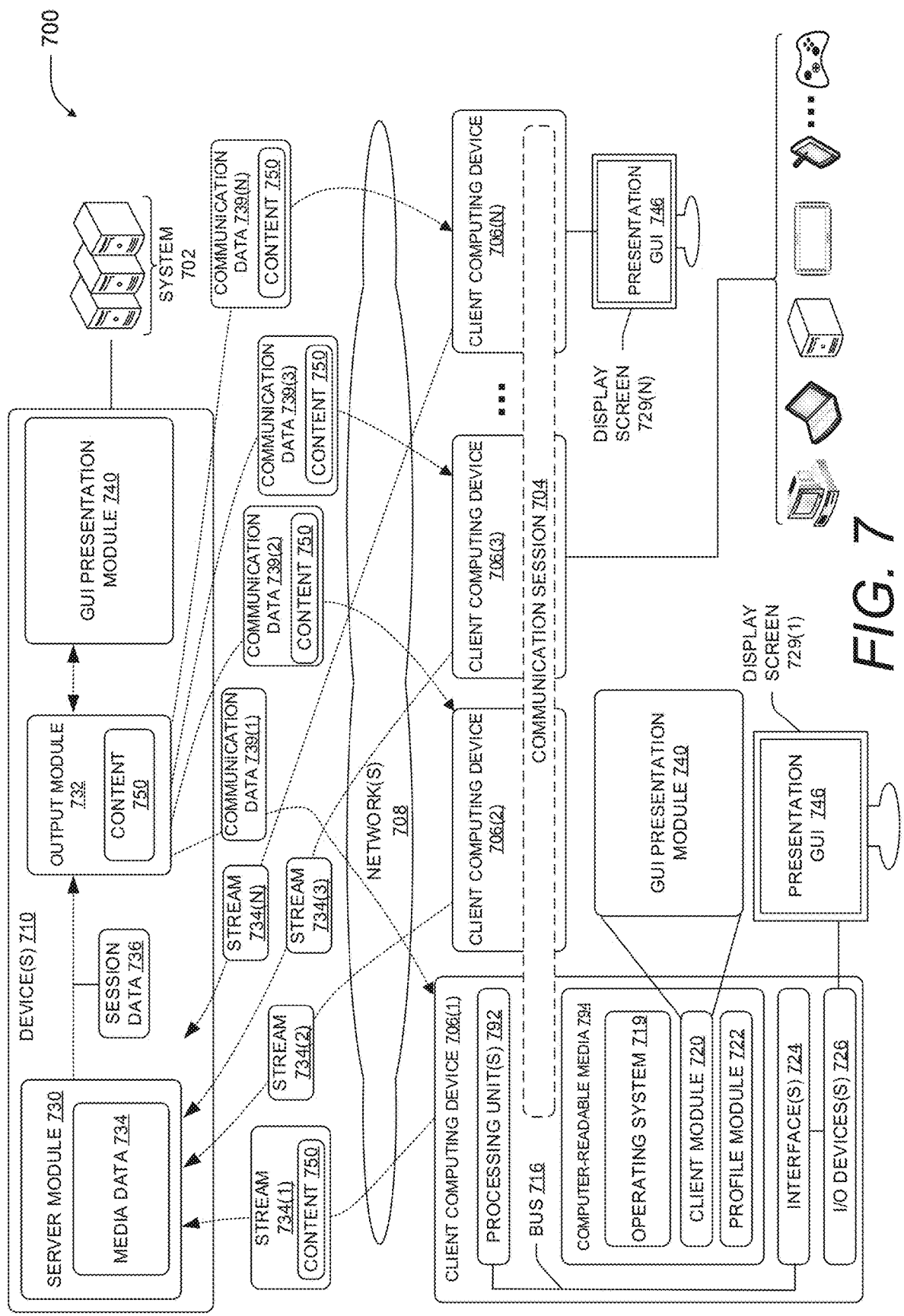
FIG. 7 is a diagram illustrating an example environment in which a system can implement the techniques disclosed herein.

FIG. 7 is a diagram illustrating an example environment 700 in which a system 702 can implement the techniques disclosed herein. In some implementations, a system 702 may function to collect, analyze, and share data defining one or more objects that are displayed to users of a communication session 1004.

As illustrated, the communication session 703 may be implemented between a number of client computing devices 706(1) through 706(N) (where N is a number having a value of two or greater) that are associated with or are part of the system 702. The client computing devices 706(1) through 706(N) enable users, also referred to as individuals, to participate in the communication session 703.

In this example, the communication session 703 is hosted, over one or more network(s) 708, by the system 702. That is, the system 702 can provide a service that enables users of the client computing devices 706(1) through 706(N) to participate in the communication session 703 (e.g., via a live viewing and/or a recorded viewing). Consequently, a "participant" to the communication session 703 can comprise a user and/or a client computing device (e.g., multiple users may be in a room participating in a communication session via the use of a single client computing device), each of which can communicate with other participants. As an alternative, the communication session 703 can be hosted by one of the client computing devices 706(1) through 706(N) utilizing peer-to-peer technologies. The system 702 can also host chat conversations and other team collaboration functionality (e.g., as part of an application suite).

In some implementations, such chat conversations and other team collaboration functionality are considered external communication sessions distinct from the communication session 703. A computing system 702 that collects participant data in the communication session 703 may be able to link to such external communication sessions. Therefore, the system may receive information, such as date, time, session particulars, and the like, that enables connectivity to such external communication sessions. In one example, a chat conversation can be conducted in accordance with the communication session 703. Additionally, the system 702 may host the communication session 703, which includes at least a plurality of participants co-located at a meeting location, such as a meeting room or auditorium, or located in disparate locations.

In examples described herein, client computing devices 706(1) through 706(N) participating in the communication session 703 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 703 live as activity occurs, or alternatively, via a recording at a later time after the activity occurs. In examples described herein, client computing devices 706(1) through 706(N) participating in the communication session 703 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 702 of FIG. 7 includes device(s) 710. The device(s) 710 and/or other components of the system 702 can include distributed computing resources that communicate with one another and/or with the client computing devices 706(1) through 706(N) via the one or more network(s) 708. In some examples, the system 702 may be an independent system that is tasked with managing aspects of one or more communication sessions such as communication session 703. As an example, the system 702 may be managed by entities such as SLACK, WEBEX, GOTOMEETING, GOOGLE HANGOUTS, etc.

Network(s) 708 may include, for example, public networks such as the Internet, private networks such as an institutional and/or personal intranet, or some combination of private and public networks. Network(s) 708 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 708 may utilize communications protocols, including packet-based and/or datagram-based protocols such as Internet protocol ("IP"), transmission control protocol ("TCP"), user datagram protocol ("UDP"), or other types of protocols. Moreover, network(s) 708 may also include a number of devices that facilitate network communications and/or form a hardware basis for the networks, such as switches, routers, gateways, access points, firewalls, base stations, repeaters, backbone devices, and the like.

In some examples, network(s) 708 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.7 standards (e.g., 802.7g, 802.7n, 802.7ac and so forth), and other standards.

In various examples, device(s) 710 may include one or more computing devices that operate in a cluster or other grouped configuration to share resources, balance load, increase performance, provide fail-over support or redundancy, or for other purposes. For instance, device(s) 710 may belong to a variety of classes of devices such as traditional server-type devices, desktop computer-type devices, and/or mobile-type devices. Thus, although illustrated as a single type of device or a server-type device, device(s) 710 may include a diverse variety of device types and are not limited to a particular type of device. Device(s) 710 may represent, but are not limited to, server computers, desktop computers, web-server computers, personal computers, mobile computers, laptop computers, tablet computers, or any other sort of computing device.

A client computing device (e.g., one of client computing device(s) 706(1) through 706(N)) (each of which are also referred to herein as a "data processing system") may belong to a variety of classes of devices, which may be the same as, or different from, device(s) 710, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 706(1) through 706(N) of the various classes and device types can represent any type of computing device having one or more data processing unit(s) 792 operably connected to computer-readable media 794 such as via a bus 716, which in some instances can include one or more of a system bus, a data bus, an address bus, a PCI bus, a Mini-PCI bus, and any variety of local, peripheral, and/or independent buses.

Executable instructions stored on computer-readable media 794 may include, for example, an operating system 719, a client module 720, a profile module 722, and other modules, programs, or applications that are loadable and executable by data processing units(s) 792.

Client computing device(s) 706(1) through 706(N) may also include one or more interface(s) 724 to enable communications between client computing device(s) 706(1) through 706(N) and other networked devices, such as device(s) 710, over network(s) 708. Such network interface(s) 724 may include one or more network interface controllers (NICs) or other types of transceiver devices to send and receive communications and/or data over a network. Moreover, client computing device(s) 706(1) through 706(N) can include input/output ("I/O") interfaces (devices) 726 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 7 illustrates that client computing device 706(1) is in some way connected to a display device (e.g., a display screen 729(N)), which can display a UI according to the techniques described herein.

In the example environment 700 of FIG. 7, client computing devices 706(1) through 706(N) may use their respective client modules 720 to connect with one another and/or other external device(s) in order to participate in the communication session 703, or in order to contribute activity to a collaboration environment. For instance, a first user may utilize a client computing device 706(1) to communicate with a second user of another client computing device 706(2). When executing client modules 720, the users may share data, which may cause the client computing device 706(1) to connect to the system 702 and/or the other client computing devices 706(2) through 706(N) over the network(s) 708.

The client computing device(s) 706(1) through 706(N) may use their respective profile modules 722 to generate participant profiles (not shown in FIG. 7) and provide the participant profiles to other client computing devices and/or to the device(s) 710 of the system 702. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 7, the device(s) 710 of the system 702 include a server module 730 and an output module 732. In this example, the server module 730 is configured to receive, from individual client computing devices such as client computing devices 706(1) through 706(N), media streams 734(1) through 734(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 730 is configured to receive a collection of various media streams 734(1) through 734(N) during a live viewing of the communication session 703 (the collection being referred to herein as "media data 734"). In some scenarios, not all of the client computing devices that participate in the communication session 703 provide a media stream. For example, a client computing device may only be a consuming, or a "listening", device such that it only receives content associated with the communication session 703 but does not provide any content to the communication session 703.

In various examples, the server module 730 can select aspects of the media streams 734 that are to be shared with individual ones of the participating client computing devices 706(1) through 706(N). Consequently, the server module 730 may be configured to generate session data 736 based on the streams 734 and/or pass the session data 736 to the output module 732. Then, the output module 732 may communicate communication data 739 to the client computing devices (e.g., client computing devices 706(1) through 706(3) participating in a live viewing of the communication session). The communication data 739 may include video, audio, and/or other content data, provided by the output module 732 based on content 750 associated with the output module 732 and based on received session data 736.

As shown, the output module 732 transmits communication data 739(1) to client computing device 706(1), and transmits communication data 739(2) to client computing device 706(2), and transmits communication data 739(3) to client computing device 706(3), etc. The communication data 739 transmitted to the client computing devices can be the same or can be different (e.g., positioning of streams of content within a user interface may vary from one device to the next).

In various implementations, the device(s) 710 and/or the client module 720 can include GUI presentation module 740. The GUI presentation module 740 may be configured to analyze communication data 739 that is for delivery to one or more of the client computing devices 706. Specifically, the UI presentation module 740, at the device(s) 710 and/or the client computing device 706, may analyze communication data 739 to determine an appropriate manner for displaying video, image, and/or content on the display screen 729 of an associated client computing device 706. In some implementations, the GUI presentation module 740 may provide video, image, and/or content to a presentation GUI 746 rendered on the display screen 729 of the associated client computing device 706. The presentation GUI 746 may be caused to be rendered on the display screen 729 by the GUI presentation module 740. The presentation GUI 1146 may include the video, image, and/or content analyzed by the GUI presentation module 740.

In some implementations, the presentation GUI 746 may include a plurality of sections or grids that may render or comprise video, image, and/or content for display on the display screen 729. For example, a first section of the presentation GUI 746 may include a video feed of a presenter or individual, a second section of the presentation GUI 746 may include a video feed of an individual consuming meeting information provided by the presenter or individual. The GUI presentation module 740 may populate the first and second sections of the presentation GUI 746 in a manner that properly imitates an environment experience that the presenter and the individual may be sharing.

In some implementations, the GUI presentation module 740 may enlarge or provide a zoomed view of the individual represented by the video feed in order to highlight a reaction, such as a facial feature, the individual had to the presenter. In some implementations, the presentation GUI 746 may include a video feed of a plurality of participants associated with a meeting, such as a general communication session. In other implementations, the presentation GUI 746 may be associated with a channel, such as a chat channel, enterprise teams channel, or the like. Therefore, the presentation GUI 746 may be associated with an external communication session that is different than the general communication session.

Figure 8:
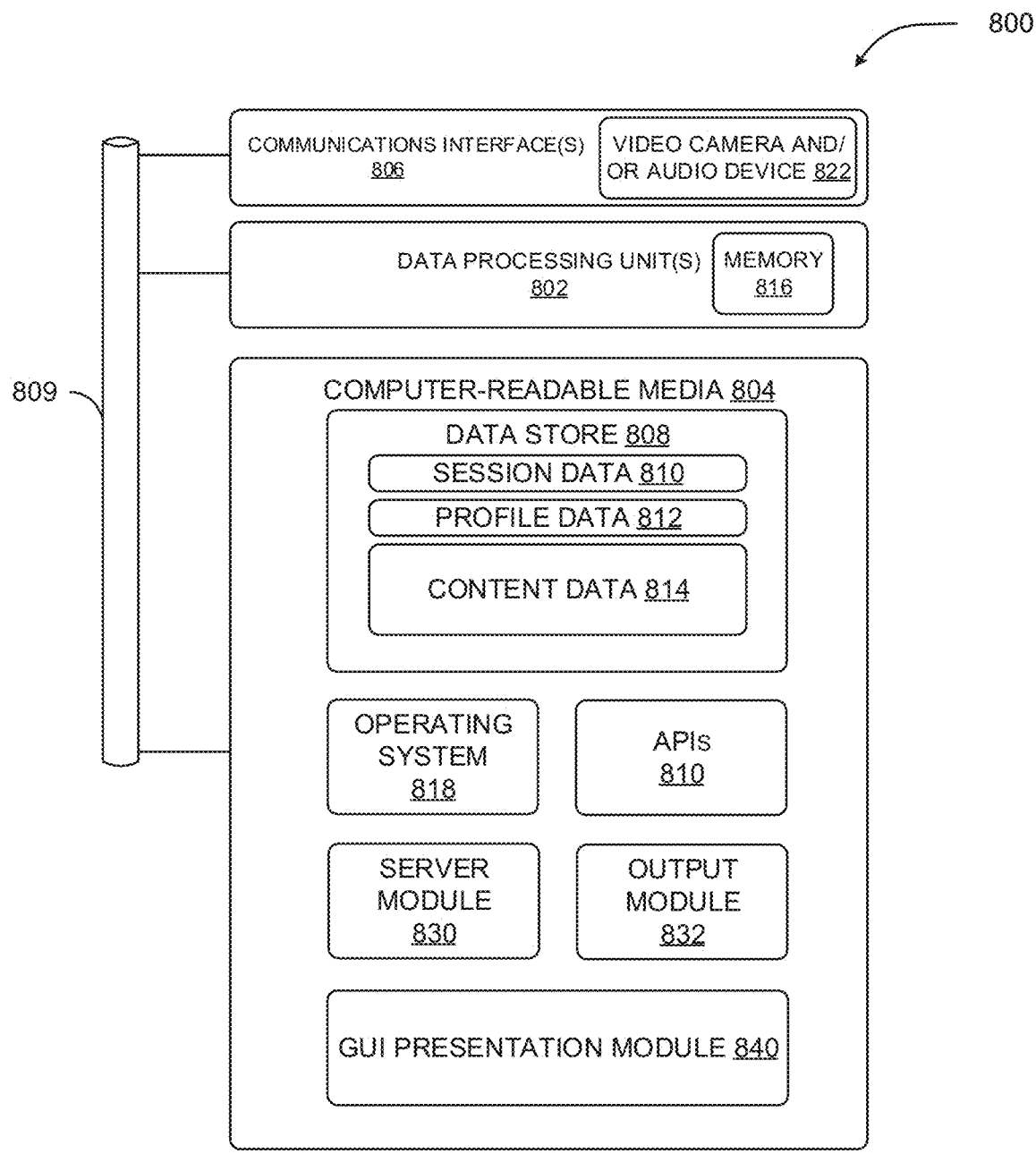
FIG. 8 illustrates a diagram that shows example components of an example device (also referred to herein as a "computing device") configured to generate data for some of the user interfaces disclosed herein.

FIG. 8 illustrates a diagram that shows example components of an example device 800 (also referred to herein as a "computing device") configured to generate data for some of the user interfaces disclosed herein. The device 800 may generate data that may include one or more sections that may render or comprise video, images, virtual objects, and/or content for display on the display screen 189. The device 800 may represent one of the device(s) described herein. Additionally, or alternatively, the device 800 may represent one of the client computing devices 1106.

As illustrated, the device 800 includes one or more data processing unit(s) 802, computer-readable media 804, and communication interface(s) 806. The components of the device 800 are operatively connected, for example, via a bus 809, which may include one or more of a system bus, a data bus, an address bus, a PCI bus, a Mini-PCI bus, and any variety of local, peripheral, and/or independent buses.

As utilized herein, data processing unit(s), such as the data processing unit(s) 802 and/or data processing unit(s) 1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 804 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 806 may represent, for example, network interface controllers ("NICs") or other types of transceiver devices to send and receive communications over a network. Furthermore, the communication interface(s) 806 may include one or more video cameras and/or audio devices 822 to enable generation of video feeds and/or still images, and so forth.

In the illustrated example, computer-readable media 804 includes a data store 808. In some examples, the data store 808 includes data storage such as a database, data warehouse, or other type of structured or unstructured data storage. In some examples, the data store 808 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 808 may store data for the operations of processes, applications, components, and/or modules stored in computer-readable media 804 and/or executed by data processing unit(s) 802 and/or accelerator(s). For instance, in some examples, the data store 808 may store session data 810 (e.g., session data 1136 as shown in FIG. 11), profile data 88 (e.g., associated with a participant profile), and/or other data. The session data 810 can include a total number of participants (e.g., users and/or client computing devices) in a communication session, activity that occurs in the communication session, a list of invitees to the communication session, and/or other data related to when and how the communication session is conducted or hosted. The data store 808 may also include content data 814, such as the content that includes video, audio, or other content for rendering and display on one or more of the display screens 189.

Alternately, some or all of the above-referenced data can be stored on separate memories 816 on board one or more data processing unit(s) 802 such as a memory on board a CPU-type processor, a GPU-type processor, an FPGA-type accelerator, a DSP-type accelerator, and/or another accelerator. In this example, the computer-readable media 804 also includes an operating system 818 and application programming interface(s) 810 (APIs) configured to expose the functionality and the data of the device 800 to other devices. Additionally, the computer-readable media 804 includes one or more modules such as the server module 830, the output module 832, and the GUI presentation module 840, although the number of illustrated modules is just an example, and the number may vary higher or lower. That is, functionality described herein in association with the illustrated modules may be performed by a fewer number of modules or a larger number of modules on one device or spread across multiple devices.

The presently disclosed technologies are believed to be applicable to a variety of systems and approaches for presenting a status indicator within a first digital context in response to a user interacting with a data object within a second digital context. Furthermore, the presently disclosed technologies are believed to be applicable to a variety of systems and approaches for enabling a recipient of the status indicator to initiate communications, directly from the first digital context, with the user that is interacting with the data object within the second digital context. Aspects of the disclosed technologies are described in the context of a unified communications platform. While the presently disclosed technologies are not necessarily limited to this context, an appreciation of various aspects of the presently disclosed technologies is best gained through a discussion of examples in this specific context. However, the presently disclosed technologies may also be deployed in scenarios that do not include a unified communications platform such as, for example, file synchronization platforms (e.g., ONEDRIVE, DROPBOX, etc.) file directory platforms (e.g., WINDOWS, MacOS, etc.) photo previews, SharePoint, and so on. It should also be appreciated that many variations and modifications may be made to the above-described examples, the elements of which are to be understood as being among other acceptable examples. All such modifications and variations are intended to be included herein within the scope of this disclosure and protected by the following claims.

Example Clauses

Example Clause A, a computer-implemented method for providing status indicators across different digital contexts, the method comprising: causing a display device to render, in association with a first user, a first graphical user interface (GUI) that corresponds to a first digital context, and wherein the first GUI includes a graphical representation of a data object that has been shared within the first digital context; monitoring user activity associated with a second user interacting with content, of the data object, within a second digital context; determining whether the user activity, associated with the second user interacting with content, meets one or more status indicator criteria; and in response to determining that the user activity meets the one or more status indicator criteria, causing the display device to render a status indicator in association with the graphical representation of the data object, wherein the status indicator includes an embedded control that is selectable to enable the first user to initiate communications, from within the first digital context, with the second user that is interacting with the content within the second digital context.

Example Clause B, the computer-implemented method of Example Clause A, wherein initiating the communications includes at least: generating at least one message within the first digital context, and causing the at least one message to be exposed to the second user within the second digital context.

Example Clause C, the computer-implemented method of any one of Example Clauses A through B, wherein determining that the user activity meets the one or more status indicator criteria includes determining that the user activity associated with the second user indicates that the second user is interacting with a particular portion of the content that corresponds to the first user based on a level of contribution that the first user has made in relation to the particular portion of the content.

Example Clause D, the computer-implemented method of any one of Example Clauses A through C, further comprising analyzing the user activity associated with the second user to determine whether to classify one or more edits that the second user has made to the content of the data object as substantive edits or non-substantive edits, and wherein determining that the user activity meets the one or more status indicator criteria includes determining to classify the edits as substantive edits.

Example Clause E, the computer-implemented method of any one of Example Clauses A through D, further comprising analyzing the user activity associated with the second user to determine whether the user activity reaches a threshold activity level for triggering expose of the status indicator, and wherein determining that the user activity meets the one or more status indicator criteria includes determining that the user activity reaches the threshold activity level.

Example Clause F, the computer-implemented method of any one of Example Clauses A through E, wherein determining that the user activity meets the one or more status indicator criteria includes determining that the user activity associated with the second user includes an identification of the first user.

Example Clause G, the computer-implemented method of any one of Example Clauses A through F, further comprising: determining a current status associated with the second user; receiving available action parameters that prescribe at least one computing action to make available to the first user based on the current status associated with the second user; and determining the at least one action that is available to the first user within the first digital context based on current status associated with the second user.

Example Clause H, the computer-implemented method of any one of Example Clauses A through G, further comprising: receiving available action parameters that prescribe at least one computing action to make available to the first user based on one or more factors; and determining the at least one action that is available to the first user within the first digital context based on the available action parameters.

Example Clause I, a system, comprising: at least one processor; and at least one memory in communication with the at least one processor, the at least one memory having computer-readable instructions stored thereupon that, when executed by the at least one processor, cause the at least one processor to: generate digital context interface data to cause a first client device to render a first graphical user interface (GUI) that corresponds to a first digital context, wherein the first GUI includes a graphical representation of a data object that has been shared within the first digital context; monitor user activity associated with a second client device to determine when status indicator criteria have been satisfied with respect to the data object within a second digital context; update the digital context interface data to cause the first client device to render, within the first GUI that corresponds to the first digital context, a status indicator in association with the data object, wherein the status indicator includes an embedded control that is selectable to expose a cross-context message generation field; receive, via the first client device, message content in association with the cross-context message generation field that is rendered within the first GUI; and cause the second client device to render the message content within a second GUI that corresponds to the second digital context.

Example Clause J, the system of Example Clause I, wherein the first digital context corresponds to a message thread GUI that is associated with a plurality of persistent messages of a collaboration platform, and wherein the second digital context corresponds to a content editing GUI that is usable to edit content of the data object.

Example Clause K, the system of any one of Example Clauses I through J, wherein the computer-readable instructions further cause the at least one processor to: analyze the user activity associated with the second client device to determine whether the user activity reaches a threshold activity level for triggering expose of the status indicator, and wherein updating the contextual data is responsive to the user activity reaching the threshold activity level.

Example Clause L, the system of any one of Example Clauses I through K, wherein the computer-readable instructions further cause the at least one processor to: analyze the user activity associated with the second client device to determine whether the user activity includes editing content of the data object in a predefined manner, and wherein updating the contextual data is responsive to the content being edited in the predefined manner.

Example Clause M, the system of any one of Example Clauses I through L, wherein the computer-readable instructions further cause the at least one processor to: determine a current status of a particular user associated with the user activity, wherein causing that the first client device to render the cross-context message generation field is based on the current status of the particular user.

Example Clause N, the system of any one of Example Clauses I through M, wherein determining that the status indicator criteria have been satisfied includes determining that the user activity reaches a threshold activity level for triggering expose of the status indicator.

Example Clause O, the system of any one of Example Clauses I through N, wherein determining that the status indicator criteria have been satisfied includes determining that the user activity includes one or more substantive edits to content of the data object.

Example Clause P, a system comprising: means for causing a first client device to render a first graphical user interface (GUI) arrangement in association with a first user, wherein the first GUI arrangement includes an icon that graphically represents a data object that has been shared within a first digital context that corresponds to the first GUI; means for monitoring user activity that occurs at a second client device in association with a second user interacting with content of the data object within a second digital context that corresponds to a second GUI arrangement; means for analyzing the user activity to determine whether the user activity meets one or more status indicator criteria; means for updating the first GUI arrangement for the first digital context to include: a status indicator that is rendered in association with the icon that graphically represents the data object, and a cross-context message generation field for transmitting messages between the first digital context and the second digital context; and means for updating the second GUI arrangement to cause the second digital context at the second client device to include message content that is received, from the first client device, via the cross-context message generation field that is rendered within the first digital context.

Example Clause Q, the system of Example Clause P, wherein the first GUI of the first digital context is a message thread GUI that is associated with a plurality of persistent messages of a collaboration platform, and wherein the second GUI of the second digital context is a content editing GUI that is usable to edit content of the data object.

Example Clause R, the system of any one of Example Clauses P through Q, wherein determining that the user activity meets the one or more status indicator criteria includes determining that the user activity includes one or more substantive edits to content of the data object.

Example Clause S, the system of any one of Example Clauses P through R, wherein determining that the user activity meets the one or more status indicator criteria includes determining that the user activity reaches a threshold activity level that includes at least one of: the second user interacting with the content of the data object for at least a threshold amount of time, or the second user editing at least a threshold number of characters to the content of the data object.

Example Clause T, the system of any one of Example Clauses P through S, wherein determining that the user activity meets the one or more status indicator criteria includes determining that a current status of the second user matches a predetermined status.

Conclusion

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for providing status indicators across different applications, the method comprising:

causing a display of a first client device to render, in association with a first user, a first graphical user interface (GUI) that corresponds to a first application that is configured to provision access to a first messaging thread and a plurality of files by a plurality of users, wherein:
  the first GUI includes a graphical representation of a particular file that has been shared within the first application; and
  the plurality of users includes the first user, a second user, and at least one other user;
concurrently with the display of the first client device rendering the graphical representation of the particular file within the first GUI, monitoring user activity associated with the second user editing content, of the particular file, at a second client device via a second GUI that corresponds to a second application that is configured to facilitate user edits to the content of the particular file;
determining that the user activity, associated with the second user editing the content via the second GUI that corresponds to the second application, meets one or more status indicator criteria;
in response to determining that the user activity meets the one or more status indicator criteria, causing the display of the first client device to update the first GUI to include a status indicator that includes:
  (a) an indication reflecting a status of the second user based on the determined user activity, and
  (b) an embedded control that is rendered in association with the graphical representation of the particular file and that is selectable to expose a menu of actions available to the first user, wherein:
    a first action in the menu of actions enables the first user to initiate a second messaging thread, without leaving the first application, with the second user while the second user is editing the content of the particular file via the second GUI that corresponds to the second application, wherein the second messaging thread is separate from the first messaging thread and the second messaging thread does not include the at least one other user; and
    a second action in the menu of actions enables the first user to preview, without leaving the first application, the user activity while the second user is editing the content of the particular file via the second GUI that corresponds to the second application;
in response to a determination that the embedded control has been selected by way of the first GUI, exposing the menu of actions available to the first user; and
in response to receiving a selection of the first action in the menu of actions:
  initiating the second messaging thread with the second user and not the at least one other user without leaving the first application; and
  causing the second messaging thread to be displayed within the second application that is configured to facilitate the user edits to the content of the particular file; or
in response to receiving a selection of the second action in the menu of actions, previewing, for the first user and without leaving the first application, the user activity while the second user is editing the content of the particular file via the second GUI that corresponds to the second application.

2. The computer-implemented method of claim 1, wherein determining that the user activity meets the one or more status indicator criteria includes determining that the user activity associated with the second user indicates that the second user is interacting with a particular portion of the content that corresponds to the first user based on a level of contribution that the first user has made in relation to the particular portion of the content.

3. The computer-implemented method of claim 1, further comprising analyzing the user activity associated with the second user to determine whether to classify one or more edits that the second user has made to the content of the particular file as substantive edits or non-substantive edits, and wherein determining that the user activity meets the one or more status indicator criteria includes determining to classify the edits as substantive edits.

4. The computer-implemented method of claim 1, further comprising analyzing the user activity associated with the second user to determine whether the user activity reaches a threshold activity level for triggering expose of the status indicator, and wherein determining that the user activity meets the one or more status indicator criteria includes determining that the user activity reaches the threshold activity level.

5. The computer-implemented method of claim 1, wherein determining that the user activity meets the one or more status indicator criteria includes determining that the user activity associated with the second user includes an identification of the first user.

6. The computer-implemented method of claim 1, further comprising:
   determining that a current status associated with the second user corresponds to an available status;
   receiving available action parameters that prescribe at least one computing action to make available to the first user based on the available status; and
   determining the at least one computing action to make available to the first user within the first application based on the available status.

7. The computer-implemented method of claim 1, further comprising:
   receiving available action parameters that prescribe at least one computing action to make available to the first user based on one or more factors; and
   determining the at least one computing action to make available to the first user within the first application based on the available action parameters.

8. A system, comprising:
   at least one processor; and
   at least one memory in communication with the at least one processor, the at least one memory having computer-readable instructions stored thereupon that, when executed by the at least one processor, cause the at least one processor to perform operations comprising:
      causing a display of a first client device to render, in association with a first user, a first graphical user interface (GUI) that corresponds to a first application that is configured to provision access to a first messaging thread and a plurality of files by a plurality of users, wherein:
         the first GUI includes a graphical representation of a particular file that has been shared within the first application; and
         the plurality of users includes the first user, a second user, and at least one other user;
      concurrently with the display of the first client device rendering the graphical representation of the particular file within the first GUI, monitoring user activity associated with the second user editing content, of the particular file, at a second client device via a second GUI that corresponds to a second application that is configured to facilitate user edits to the content of the particular file;
      determining that the user activity, associated with the second user editing the content via the second GUI that corresponds to the second application, meets one or more status indicator criteria;
      in response to determining that the user activity meets the one or more status indicator criteria, causing the display of the first client device to update the first GUI to include a status indicator that includes:
         (a) an indication reflecting a status of the second user based on the determined user activity, and
         (b) an embedded control that is rendered in association with the graphical representation of the particular file and that is selectable to expose a menu of actions available to the first user, wherein:
            a first action in the menu of actions enables the first user to initiate a second messaging thread, without leaving the first application, with the second user while the second user is editing the content of the particular file via the second GUI that corresponds to the second application, wherein the second messaging thread is separate from the first messaging thread and the second messaging thread does not include the at least one other user; and
            a second action in the menu of actions enables the first user to preview, without leaving the first application, the user activity while the second user is editing the content of the particular file via the second GUI that corresponds to the second application;
      in response to a determination that the embedded control has been selected by way of the first GUI, exposing the menu of actions available to the first user; and
      in response to receiving a selection of the first action in the menu of actions:
         initiating the second messaging thread with the second user and not the at least one other user without leaving the first application; and
         causing the second messaging thread to be displayed within the second application that is configured to facilitate the user edits to the content of the particular file; or
      in response to receiving a selection of the second action in the menu of actions, previewing, for the first user and without leaving the first application, the user activity while the second user is editing the content of the particular file via the second GUI that corresponds to the second application.

9. The system of claim 8, wherein determining that the user activity meets the one or more status indicator criteria includes determining that the user activity associated with the second user indicates that the second user is interacting with a particular portion of the content that corresponds to the first user based on a level of contribution that the first user has made in relation to the particular portion of the content.

10. The system of claim 8, wherein the operations further comprise analyzing the user activity associated with the second user to determine whether to classify one or more edits that the second user has made to the content of the particular file as substantive edits or non-substantive edits, and wherein determining that the user activity meets the one or more status indicator criteria includes determining to classify the edits as substantive edits.

11. The system of claim 8, wherein the operations further comprise analyzing the user activity associated with the second user to determine whether the user activity reaches a threshold activity level for triggering expose of the status indicator, and wherein determining that the user activity meets the one or more status indicator criteria includes determining that the user activity reaches the threshold activity level.

12. The system of claim 8, wherein determining that the user activity meets the one or more status indicator criteria includes determining that the user activity associated with the second user includes an identification of the first user.

13. The system of claim 8, wherein the operations further comprise:
determining that a current status associated with the second user corresponds to an available status;
receiving available action parameters that prescribe at least one computing action to make available to the first user based on the available status; and
determining the at least one computing action to make available to the first user within the first application based on the available status.

14. The system of claim 8, wherein the operations further comprise:
receiving available action parameters that prescribe at least one computing action to make available to the first user based on one or more factors; and
determining the at least one computing action to make available to the first user within the first application based on the available action parameters.

15. At least one computer storage medium in communication with at least one processor, the at least one computer storage medium having computer-readable instructions stored thereupon that, when executed by the at least one processor, cause the at least one processor to perform operations comprising:
causing a display of a first client device to render, in association with a first user, a first graphical user interface (GUI) that corresponds to a first application that is configured to provision access to a first messaging thread and a plurality of files by a plurality of users, wherein:
the first GUI includes a graphical representation of a particular file that has been shared within the first application; and
the plurality of users includes the first user, a second user, and at least one other user;
concurrently with the display of the first client device rendering the graphical representation of the particular file within the first GUI, monitoring user activity associated with the second user editing content, of the particular file, at a second client device via a second GUI that corresponds to a second application that is configured to facilitate user edits to the content of the particular file;
determining that the user activity, associated with the second user editing the content via the second GUI that corresponds to the second application, meets one or more status indicator criteria;
in response to determining that the user activity meets the one or more status indicator criteria, causing the display of the first client device to update the first GUI to include a status indicator that includes:
(a) an indication reflecting a status of the second user based on the determined user activity, and
(b) an embedded control that is rendered in association with the graphical representation of the particular file and that is selectable to expose a menu of actions available to the first user, wherein:
a first action in the menu of actions enables the first user to initiate a second messaging thread, without leaving the first application, with the second user while the second user is editing the content of the particular file via the second GUI that corresponds to the second application, wherein the second messaging thread is separate from the first messaging thread and the second messaging thread does not include the at least one other user; and
a second action in the menu of actions enables the first user to preview, without leaving the first application, the user activity while the second user is editing the content of the particular file via the second GUI that corresponds to the second application;
in response to a determination that the embedded control has been selected by way of the first GUI, exposing the menu of actions available to the first user; and
in response to receiving a selection of the first action in the menu of actions:
initiating the second messaging thread with the second user and not the at least one other user without leaving the first application; and
causing the second messaging thread to be displayed within the second application that is configured to facilitate the user edits to the content of the particular file; or
in response to receiving a selection of the second action in the menu of actions, previewing, for the first user and without leaving the first application, the user activity while the second user is editing the content of the particular file via the second GUI that corresponds to the second application.

16. The at least one computer storage medium of claim 15, wherein determining that the user activity meets the one or more status indicator criteria includes determining that the user activity associated with the second user indicates that the second user is interacting with a particular portion of the content that corresponds to the first user based on a level of contribution that the first user has made in relation to the particular portion of the content.

17. The at least one computer storage medium of claim 15, wherein the operations further comprise analyzing the user activity associated with the second user to determine whether to classify one or more edits that the second user has made to the content of the particular file as substantive edits or non-substantive edits, and wherein determining that the user activity meets the one or more status indicator criteria includes determining to classify the edits as substantive edits.

18. The at least one computer storage medium of claim 15, wherein the operations further comprise analyzing the user activity associated with the second user to determine whether the user activity reaches a threshold activity level for triggering expose of the status indicator, and wherein determining that the user activity meets the one or more status indicator criteria includes determining that the user activity reaches the threshold activity level.

19. The at least one computer storage medium of claim 15, wherein determining that the user activity meets the one or more status indicator criteria includes determining that the user activity associated with the second user includes an identification of the first user.

20. The at least one computer storage medium of claim 15, wherein the operations further comprise:
   determining that a current status associated with the second user corresponds to an available status;
   receiving available action parameters that prescribe at least one computing action to make available to the first user based on the available status; and
   determining the at least one computing action to make available to the first user within the first application based on the available status.

\* \* \* \* \*